(12) United States Patent
Zaggl et al.

(10) Patent No.: US 11,097,527 B2
(45) Date of Patent: *Aug. 24, 2021

(54) PROCESS FOR THE FORMATION OF A POROUS FILM ASSEMBLY

(71) Applicant: W. L. Gore & Associates GmbH, Putzbrunn (DE)

(72) Inventors: Alexander Zaggl, Feldkirchen-Westerham (DE); Michael Rittmann, Putzbrunn (DE)

(73) Assignee: W. L. Gore & Associates GMBH, Putzbrunn (DE)

( * ) Notice: Subject to any disclaimer, the term of this patent is extended or adjusted under 35 U.S.C. 154(b) by 1063 days.

This patent is subject to a terminal disclaimer.

(21) Appl. No.: 15/540,274

(22) PCT Filed: Feb. 24, 2016

(86) PCT No.: PCT/EP2016/053853
§ 371 (c)(1),
(2) Date: Jun. 28, 2017

(87) PCT Pub. No.: WO2016/135188
PCT Pub. Date: Sep. 1, 2016

(65) Prior Publication Data
US 2018/0333946 A1   Nov. 22, 2018
US 2020/0094540 A9   Mar. 26, 2020

(30) Foreign Application Priority Data

Feb. 24, 2015   (EP) .................................... 15000530

(51) Int. Cl.
*B05C 5/00*   (2006.01)
*B32B 38/00*   (2006.01)
(Continued)

(52) U.S. Cl.
CPC .......... *B32B 38/1875* (2013.01); *B32B 25/08* (2013.01); *B32B 27/08* (2013.01);
(Continued)

(58) Field of Classification Search
None
See application file for complete search history.

(56) References Cited

U.S. PATENT DOCUMENTS

| | | |
|---|---|---|
| 3,953,566 A | 4/1976 | Gore |
| 5,026,513 A | 6/1991 | House et al. |
| 5,804,011 A | 9/1998 | Dutta |
| 5,814,405 A | 9/1998 | Branca et al. |
| 2007/0012624 A1 | 1/2007 | Bacino et al. |

(Continued)

FOREIGN PATENT DOCUMENTS

| | | |
|---|---|---|
| CN | 102893534 A | 1/2013 |
| EP | 2839949 | 2/2015 |

(Continued)

*Primary Examiner* — Carl Adams

(57) ABSTRACT

A process for the formation of an assembly comprising a structured or compacted porous film (c) comprising a) application of a porous film (d) onto an elastic substrate (a) in a stretched state such that a reversible adhesion of the film on the stretched substrate (a) occurs, and b) relaxing the substrate (a) with the applied film thereon to obtain a structured or compacted porous film (c), c) applying a support material (e) to a part of the structured or compacted film (c) so that the structured or compacted film to which no support material (e) is attached is releasable.

17 Claims, 18 Drawing Sheets

(51) Int. Cl.
   *B32B 25/08*   (2006.01)
   *B32B 27/08*   (2006.01)
   *B32B 37/18*   (2006.01)
   *G09G 3/20*    (2006.01)
   *G09G 3/34*    (2006.01)

(52) U.S. Cl.
   CPC ............ *B32B 37/182* (2013.01); *G09G 3/20* (2013.01); *B32B 2250/00* (2013.01); *B32B 2305/00* (2013.01); *B32B 2305/026* (2013.01); *B32B 2307/514* (2013.01); *B32B 2457/20* (2013.01); *G09G 3/344* (2013.01); *G09G 2300/0473* (2013.01); *G09G 2310/04* (2013.01); *G09G 2330/023* (2013.01); *G09G 2354/00* (2013.01); *G09G 2380/14* (2013.01)

(56) References Cited

U.S. PATENT DOCUMENTS

| | | | |
|---|---|---|---|
| 2012/0085280 A1* | 4/2012 | Kim | .............. B05B 15/628 |
| | | | 118/50 |
| 2013/0183515 A1 | 7/2013 | White | |
| 2014/0120286 A1 | 5/2014 | Wendlandt et al. | |
| 2014/0172066 A1 | 6/2014 | Goepfrich et al. | |

FOREIGN PATENT DOCUMENTS

| | | | | |
|---|---|---|---|---|
| JP | 1994(H06)255006 A | 9/1994 | | |
| JP | 1997(H09)500844 A | 1/1997 | | |
| WO | WO2006/017518 | 2/2006 | | |
| WO | WO2010/101544 | 9/2010 | | |
| WO | WO-2010101544 A1 * | 9/2010 | ............. | B32B 5/024 |

\* cited by examiner

PROCESS FOR THE FORMATION OF A POROUS FILM ASSEMBLY

The present invention relates to a process for the formation of an assembly comprising a structured or compacted porous film, and articles comprising said assembly, such as a vent.

It is generally known that porous material have many particular and unique properties. For instance, porous materials in the form of films or film assemblies may be permeable to gas, but not to water. Accordingly, porous materials are utilized in various fields, including not only the use as membranes, battery separators and in fuel cells, but also for the treatment of water, such as water purification and waste water treatment, and for adsorption processes. Furthermore, porous films or film assemblies find their application in venting and filtration.

In particular for venting and filtration applications, specific properties of the porous films or the film assemblies are required. For instance, a high air and/or moisture flow through the porous film or film assembly is sought for so as to increase its performance.

Apart from increasing the air and moisture flow, some applications demand other specific properties of the porous films such as thickness or thinness of the film, smaller or larger pore sizes within the film, higher or lower density of the film and combinations thereof. The ability to change the internal porous structure of films, i.e. the intra-film structure, or the structure of the film as such allows fine-tuning such properties.

For example, U.S. Pat. No. 5,026,513 discloses a process for making rapidly recoverable PTFE. The microstructure of the porous PTFE material consists of nodes interconnected by fibrils, substantially all of the fibrils having bent or wavy appearance. The PTFE is first expanded by stretching, then manually compressed in the direction of the fibrils, and afterwards restrained in the compressed state and heated.

In US 2013/0183515 articles including expanded fluoropolymer membranes having serpentine fibrils are provided. The article therein is formed by expanding a fluoropolymer tape in at least one direction to produce an expanded fluoropolymer membrane. Subsequently, the expanded membrane is thermally retracted by applying heat or retracted by adding a solvent.

Shrinkage of a biaxially expanded PTFE membrane by heating in a heating chamber is disclosed in US 2014/0172066.

While the known methods allow to modify the properties of porous films to a certain extent, there is a still the need to provide a process which allows the production of modified porous film assemblies, in particular for the application in vents or valves.

Furthermore, there is still the need for a simple and reliable process for a controlled (re-)structuring of the internal structure of a porous film.

It is thus an object of the invention to provide a process for the formation of an assembly comprising a porous film which allows tailoring or fine-tuning the outer shape or the internal structure of the porous film.

In addition, the process should be reliable, simple and cost-efficient to perform.

Furthermore, the assembly produced by said process should allow the production of articles having improved properties, such as vents and valves with improved properties, such as increased air flow.

Surprisingly, it has been found that these objects can be achieved by a process comprising the application of a porous film onto a stretched elastic substrate, and relaxing the stretched substrate so as to form a structured or compacted film, and applying a support material to the structured or compacted film so that the structured or compacted film is partially releasable.

It has further been surprisingly found that by using assemblies obtainable by said process vents can be provided, which are not only space-saving but have, for example, a significantly increased airflow.

The present invention therefore provides a process for the formation of an assembly comprising a structured or compacted porous film comprising
  a) application of a porous film onto an elastic substrate in a stretched state such that a reversible adhesion of the film on the stretched substrate occurs, and
  b) relaxing the substrate with the applied film thereon to obtain a structured or compacted porous film,
  c) applying a support material to a part of the structured or compacted film so that the structured or compacted film to which no support material is attached is releasable.

The term "compacted porous film" as used herein denotes a porous film which has been increased in density, and "compacting" as used herein means increasing the density of the porous film.

During compacting, i.e. during the production of a compacted porous film, a modification of the internal structure of the porous film occurs which, in turn, results in a reduction of its inner pore volume and hence an increase of its density.

The density of the obtained compacted film with respect to the initial, non-compacted film increases preferably by at least 10%, more preferably by at least 50%, even more preferably by at least 100%, and most preferably by at least 150%. Usually, the density of the compacted film with respect to the initial, non-compacted film increases at most 5000%.

Compacting can, for instance, also be determined by measuring the cross-sectional areas of the initial non-compacted film and the film after compacting. Compared to the initial, non-compacted film, the obtained compacted film has a reduced cross-sectional area in at least one direction.

Any cross-sectional area of the compacted film containing an axis along which compacting is performed is reduced in area. For example, if a porous film is applied to the elastic substrate in the xy-plane (in a Cartesian coordinate system having axis x, y and z) and compacted along the x-axis (i.e. the elastic substrate is relaxed in the x-direction), then any cross-sectional area of the compacted film containing the x-axis is reduced in area, such as the cross-sectional area of the compacted film in the xz-plane.

The reduction in cross-sectional area in said at least one direction of the obtained compacted film with respect to the initial, non-compacted film is preferably at least 10%, more preferably at least 25%, even more preferably at least 50%, and most preferably at least 60%. Usually, the reduction in cross-sectional area is at most 95%.

As mentioned, upon compacting the internal structure of the porous film is modified. For instance, the internal microstructure of a porous film such as ePTFE comprises nodes interconnected by fibrils. Compacting causes formation of micro pleats in the fibrils connecting the nodes, formation of buckled fibrils so that, after compacting, the fibrils typically have a bent and/or wavy appearance. As a consequence, the distance between nodes in the compacted film becomes smaller, and consequently the pore volume decreases and the density increases.

The compacting process as described herein leads to a porous film which is compacted homogeneously, i.e. the compacted film shows a homogeneous increase in density over the whole film along the compacting direction. Preferably, fluctuations in the density of the compacted film are less than 25%, more preferably less than 10% and most preferably less than 5%.

Whereas the internal structure of a compacted porous film is altered as described above, the outer shape of a compacted porous film usually remains flat, i.e. a compacted film usually does not show geometric out-of-plane structures, such as wrinkles or foldings of the film as such. Compacted films therefore usually have a structure density as defined below of 0.0/mm, or at most 0.2/mm.

By "structured porous film" a porous film is denoted which shows any kind of geometric out-of-plane structures, such as wrinkles, foldings etc. Structured porous films usually have a structure density of at least 1/mm.

Accordingly, structuring as used herein means to impart any kind of geometric out-of-plane structures, such as wrinkles, foldings etc. to the porous film. This means that the obtained structured film does not show a patterned surface, e.g. by a variation of the total thickness of an otherwise planar film, but the outer shape of the film is changed, i.e. the "complete" film is folded or wrinkled showing out-of-plane structures. The film thickness usually remains essentially the same as in the unstructured film.

A compacted porous film is distinguished from a structured porous film in several aspects:

Structuring changes the outer shape of the film, leading to out-of-plane structures. In contrast thereto, compacting changes the internal structures of the film, and causes such phenomena as, for example, bending of fibrils connecting to nodes of a porous ePTFE film, leading to an increase in density.

The density of the structured film with respect to the initial, non-structured film is usually not increased, i.e. the density of a structured film is essentially the same as in the initial unstructured film. In contrast thereto, compacting leads to a significant increase in density of the film.

The process of the invention allows in a simple manner to form an assembly comprising a structured or compacted film. The process is simple because the porous film can be applied onto the stretched elastic substrate "as it is", i.e. without the need of any physical or chemical modification.

Surprisingly, upon relaxation of the stretched substrate/film composite, the composite, or even the film, is not simply destroyed, e.g. by a complete delamination of film and substrate or a rupture of the film, but the film remains intact so that structuring or compacting occurs in a controlled manner.

In case of structuring a porous film, the film remains at least partially adhered to the elastic substrate in a recurring manner. As a consequence, the film delaminates at least partially from the elastic substrate during relaxation of the substrate.

In case of compacting a porous film, the film remains to a large extent, usually completely, adhered to the elastic substrate upon relaxation of the elastic substrate, i.e. delamination occurs only to a small extent, if at all.

Depending on the properties and the microstructure of the porous film to be applied to the elastic substrate, it may become necessary to apply the porous film in a specific direction onto the elastic substrate for obtaining a compacted or a structured film.

For example, the internal structure of porous ePTFE typically comprises stiff nodes and flexible fibrils, for instance stiff nodes in transverse direction and flexible fibrils in longitudinal direction of the film. The stiff nodes promote delamination of the film from the elastic substrate upon relaxing in transverse direction, thus leading to a structured film. On the other hand, when the film/substrate composite is relaxed in longitudinal direction, the fibrils are comparatively easy to bend so that delamination does not occur, thus leading to a compacted film.

Without wishing to be bound by theory, it is believed that this anisotropic behaviour of the film is due to an anisotropic rigidity of the film, i.e. films which have a rigidity which in two perpendicular directions in the plane of the film is different.

Preferably, for obtaining a compacted film the porous film is applied to the elastic substrate so that the direction of lowest rigidity of the film corresponds to the stretching direction of the substrate. This ensures that a uniaxial compacting occurs in a well-controlled manner.

In any case, it is very easy to find out by simple tests in which orientation a porous film must be applied to the elastic substrate so that structuring or compacting of the film is obtained.

Due to its simplicity, the process of the invention can be performed in a cost-efficient manner, both continuously or batch-wise.

In the process of the invention the porous film should be applied to the elastic substrate so that "reversible adhesion" of the film to the substrate occurs. This means that when the substrate is in its stretched state the film adheres to the substrate, and in the relaxed state of the substrate the then structured or compacted film obtained may be removed from the substrate without destroying the structured or compacted film.

The term "film" as used herein generally denotes any kind of "thin" material, i.e. material which has an extension in two dimensions that is big compared to the extension in the remaining dimension, e.g. by a factor of at least 10, or at least 100 or even more. Such thin material is sometimes also denoted as "2D structure". Preferably, the film is a membrane.

The term "porous" as used herein refers to a material which has voids throughout the internal structure which form an interconnected continuous air path from one surface to the other.

The term "porous film" as used herein denotes a film which comprises, or consists of, a porous material. For example, a porous material may be expanded polytetrafluoroethylene (ePTFE) and/or any other paste processed expanded fluoropolymers and combinations thereof.

A porous film comprising a porous material may further comprise coatings or layers laminated on a layer of said porous material, such as, but not limited to, polymeric rendered fibrils, powder coatings, non-woven coatings, partial coatings such as lines, dots, patterns.

The porous film may have a multilayered structure, wherein at least one layer comprises, or consists of, a porous material. The porous film hence may comprise, or consist of, one, two, three or more layers.

For example, the porous film may comprise, or consist of, a layer of ePTFE coated with a monolithic film, which may further comprise a second layer of ePTFE on its opposite side.

The porous film may comprise, or consist of, a woven or non-woven. For example, the porous film may comprise, or consist of, an electrospun non-woven material.

"Porous" refers to porous materials in which the pores are empty, but also refers to partially or fully imbibed porous materials, i.e. materials which have a porous structure in which the pores are partially or fully filled with a substance, as long as the porous material remains a porous matrix that may dominate the materials properties. For example, such an imbibed porous material may be a porous material in which the pores partly or fully are filled with a flexible material, such as a liquid, or an uncured, flexible substance.

The rigidity of such imbibed porous films can be tuned e.g. by temperature. If the filling material is flexible such as an uncured, liquid like or melted material, the matrix of the porous film holds the material in place and still dominates the film properties.

The film may be homogeneous or non-homogeneous in terms of its chemical composition. The film may contain voids, i.e. sections of the film do not show any matter in a lateral cut, or, preferably, may not contain voids, i.e. be closed.

The structured or compacted porous film obtained in the process of the invention is removable from the elastic substrate in a non-destructive manner.

In one embodiment, the process of the invention is carried out at room temperature, i.e. at a temperature of from 18 to 27° C., in particular 20 to 25° C. However, if a porous film is found to have a too high rigidity for the process of the invention, in particular step b), may also be carried out e.g. at an elevated temperature where the rigidity of the film is lower compared to its room temperature rigidity.

In the process of the invention, the elastic substrate may be uniaxially or biaxially stretched.

The porous film which is applied onto the elastic substrate preferably comprises, or consists of, a polymer, and more preferably comprises, or consists of, a fluoropolymer, i.e. a polymer which contains fluorine atoms, a polyvinylalcohol, a polyurethane and/or a polyolefin.

Especially polyvinylalcohol and polyurethane may also be in the form of a porous film of woven or non-woven fibres comprising, or consisting of, these materials.

In one embodiment, the porous film comprises, or consists of, polytetrafluoroethylene (PTFE), a modified PTFE, a fluorothermoplastic, a fluoroelastomer or any combination thereof.

The term "modified PTFE" as used herein is intended to denote a type of tetrafluoroethylene copolymer in which further perfluorinated, fluorinated or non-fluorinated co-monomer units are present.

In one embodiment, the porous film comprises, or consists, of expanded PTFE (ePTFE). PTFE may be expanded (i.e., drawn) in one or more directions to make the fluoropolymer film porous. Processes for making ePTFE are well known in the art, e.g. from U.S. Pat. Nos. 3,953,566 or 5,814,405.

Preferably, the porous film has a thickness of at least 0.5 µm, more preferably of at least 1 µm, even more preferably of at least 1.5 µm, and most preferably of at least 2 µm.

The porous film has preferably a thickness of at most 250 µm, more preferably at most 200 µm, even more preferably at most 175 µm, and most preferably at most 50 µm.

The porous film may have an areal weight of 0.01 g/m² or more, more preferably of 0.1 g/m² or more, and still more preferably of 0.2 g/m² or more.

The porous film may have an areal weight of 100 g/m² or less, more preferably of 80 g/m² or less, still more preferably of 50 g/m² or less, and still more preferably of 30 g/m² or less.

The elastic substrate used in the process of the invention may be any elastic material which shows the required stretchability and which shows a sufficient adhesion to the applied porous film.

Preferably, the elastic substrate comprises, or consists of, an elastomer, such as silicone rubbers, fluoro- and perfluoroelastomers nitrile rubbers, isoprene rubbers, ethylene/propylene rubbers, polyacrylic rubbers, polychloroprene rubbers, polyvinylchloride rubbers, silicone rubbers, natural rubbers and/or thermoplastic rubbers, such as thermoplastic polyurethane rubbers.

A preferable elastic substrate comprises, or consists of, polydimethylsiloxane (PDMS).

Before application of the porous film onto the elastic substrate, the substrate is stretched in at least one direction. Stretching can be performed uniaxially (e.g. in a continuous process in machine direction) or biaxially, i.e. in two perpendicular directions (e.g. in a continuous process in machine and transverse direction).

The extent of stretching is defined by the processing ratio p which as used herein is defined as $$p(\%)=100(l-L)/L+100$$

wherein l is the final length or width of the elastic substrate in its stretched state, and wherein L is the initial length or width of the elastic substrate, i.e. in its non-stretched, relaxed state.

For instance, a processing factor of 200% means that the final length l in the stretched state is two times the initial, relaxed-state length L of the substrate, i.e. $l=2 \cdot L$.

Preferably, the elastic substrate in step a) is stretched by a processing ratio of at least 110% in at least one direction, more preferably by a ratio of at least 150% in at least one direction, and most preferably by a ratio of at least 200% in at least one direction.

The elastic substrate is preferably stretched by a processing ratio of at most 1100%, more preferably by a ratio of at most 850%, and most preferably by a ratio of at most 600%.

In one embodiment, the elastic substrate is uniaxially stretched. Uniaxially means that the elastic substrate is stretched only in one direction, which may, if the process is performed continuously, either be the machine direction (MD) or the transverse direction (TD).

In another embodiment, the elastic substrate is biaxially stretched. Biaxially means that the elastic substrate is stretched in two perpendicular directions which may be, if the process is performed continuously, the machine direction (MD) and the transverse direction (TD).

Biaxial stretching can be performed simultaneously or subsequently. Simultaneously means that the elastic substrate is stretched at the same time in the two perpendicular directions, e.g. machine direction and transverse direction. Subsequently means that the elastic substrate is (fully) stretched first in one, and subsequently in the other, perpendicular direction.

The porous film is applied onto the elastic substrate in a stretched state such that reversible adhesion of the film on the stretched elastic substrate occurs.

Usually, the porous film is directly applied onto the stretched substrate, i.e. without any intermediate layer. However, such an intermediate layer may be used where necessary to obtain proper adhesion.

Application of the porous film onto the substrate is preferably done by mechanically pressing a porous film onto the stretched elastic substrate. Pressing can, for instance, be done with a rubber roll at slight pressure.

"Adhesion" as used herein means that the porous film physically adheres to the elastic substrate. Without wishing to be bound by theory, it is believed that the film physically adheres to the elastic substrate due to van-der-Waals forces.

"Reversible adhesion" means that no firm "bonding" should appear between the substrate and the film, as is the case if a coating is applied on a substrate e.g. by chemical vapour deposition to the substrate in the stretched state so that the film cannot be removed from the substrate in a non-destructive manner.

Application and adhesion of the film onto the elastic substrate occurs at a specific process temperature. The process temperature may be room temperature, or, in order to, for example to adjust the film rigidity, at an elevated temperature, especially in step b) of the process.

After application of the film to the stretched elastic substrate, the elastic substrate is relaxed in step b) of the process of the invention. Relaxing as used herein means that the strain is released from the elastic substrate and the substrate returns to its initial, non-stretched and flat state.

In a first embodiment, relaxing of the stretched elastic substrate causes the adhered porous film to compact, i.e. the cross-sectional area in at least one direction of the film is reduced, so as to obtain a compacted film. Relaxing of the stretched substrate causes, for instance, the fibrils between nodes of the porous film to bend and wrinkle, moving the nodes of the porous film closer together and thereby changing the internal film structure. During relaxation of the stretched elastic substrate, the porous film does to a far extent, if at all, not delaminate from the elastic substrate.

In a second embodiment, relaxing of the stretched elastic substrate causes the adhered self-supported porous film to e.g. wrinkle or fold, thereby obtaining a structured film. Without wishing to be bound by theory, it is believed that relaxing of the stretched substrate causes a partial or local loss of adhesion between the applied film and the elastic substrate. At those sites where a partial loss of adhesion occurs, wrinkles in the applied film can be formed.

The structures of said structured film may have a height of at least two times the thickness of the non-structured film.

The structure density in at least one direction may at least be 1 per mm.

In other embodiments of the structured porous film the structure density in at least one direction is at least 2 per mm, or is at least 3 per mm, or is at least 5 per mm.

The height of the structures in the porous film preferably is 2 µm to 2000 µm, and more preferably 20 µm to 1000 µm.

The structured porous film in one embodiment should have a theoretical or measured area increase factor of at least 1.8, in a further embodiment an area increase factor of at least 3.0, and in still a further embodiment an area increase factor of at least 5.0.

The "area increase factor" denotes the increase in total surface area of the structured film compared to the non-structured film, which is caused by the structuring, i.e. the presence of out-of-plane structures in the film.

It can be determined either theoretically by considering the processing ratio(s) or it can be measured by e.g. removing the support material of a structured film and stretching the film so that the structures are released.

For example, a structured film which was obtained by a process in which uniaxial stretching of the substrate with a processing ratio of 2 has been applied will show a (theoretical) area increase factor of 2. A structured film which was obtained by a process in which biaxial stretching of the substrate with a processing ratio of 2 in each direction has been applied will show a (theoretical) area increase factor of 4.

In one embodiment, the process further comprises a step of removing the structured or compacted porous film from the elastic substrate, which may already have been provided with a support material. Removing can be done by mechanically lifting off the compacted film from the relaxed elastic substrate.

After relaxing of the elastic substrate, a support material is applied to a part of the structured or compacted film so that the structured or compacted film to which no support material is attached is releasable.

The support material may be a continuous or discontinuous support material. Examples of continuous support materials include monolithic support materials such as films, laminates etc. Such continuous support materials are applied to a part or parts of the structured or compacted film. Examples of discontinuous support materials comprise fibres and networks of fibres, such as substantially linear fibers including strips or lines which may be parallel, not parallel or combinations thereof, for instance as grids or meshes, as well as woven networks of fibers and non-woven networks of fibers.

Preferably, the support material is a stabilising support material or an elastomeric support material.

The stabilising support material permanently "freezes" the structured or compacted state of parts of the film to which it is applied, i.e. it stabilizes/fixes the structuring or compacting of the film or parts of the film, thus making it rest permanently. The stabilising support material usually is only to a small extent stretchable, if at all.

The stabilising support material may be applied to the "free" side (opposite to the elastic substrate) of the structured or compacted porous film when it is still adhered to the relaxed, elastic substrate. In another embodiment, the stabilising support material is applied to any side of the structured or compacted film after the film has been removed from the elastic substrate.

The stabilising support material may be in the form of a mesh, a grid or in the form of one or more stripes or lines. These strips or lines may be aligned parallel, non-parallel or in a combination thereof. The stabilising support material can be, for instance, a polyethylene nonwoven material, a polypropylene knit material or a thermoplastic grid coating.

Alternatively, the stabilising support material may be in the form of a monolith, such as a film, particularly a polymeric film such as a polyalkylene film e.g. polyethylene or polypropylene films. The monolith may be applied to a part or parts of, for instance a side, of the structured or compacted film, for instance in discrete i.e. separate and distinct areas. Preferably such a monolith should be porous providing an interconnected continuous path for gases from one surface to the other.

Elastomeric support material means that the structure of the elastic support material may undergo shape changes, such as reversible shape changes. The elastomeric support material is, thus, usually stretchable. Preferably, the elastomeric support material comprises, or consists of, an elastomer. Preferably, the elastomer comprises, or consists of a polyurethane, a polysiloxane, fluorosilicone and/or rubber.

The elastomeric support material may comprise elastomeric fibers, such as polyurethane, polysiloxane, fluorosilicone and/or rubber fibers.

The elastomeric support material may be in the form of a mesh, a grid or in the form of one or more stripes or lines. These strips or lines may be aligned parallel, non-parallel or in a combination thereof.

In order to bond the support material to the structured or compacted film, for example, the support material may be provided with an adhesive layer prior to applying it to the film.

Additionally, an adhesive such as a hot-melt web adhesive may be used to bond the support material to the structured or compacted film, which is first applied to the structured or compacted material.

In step c), the support material is applied to the structured or compacted film so that the structured or compacted film to which no support material is attached is releasable.

The term "releasing" as used herein means that the changes of a porous film caused by the compacting or the structuring process, are at least partially, or even completely, reversed, i.e. a "released" film is at least partially de-compacted or de-structured.

Thus, releasing a compacted film typically causes the buckled fibrils to at least partially "straighten". As a consequence, the distance between the nodes in the released film becomes larger compared to the compacted film, and the density of the porous film in the released parts decreases and may reach up to the low density of the initial, non-compacted film.

Releasing a structured film typically causes the out-of-plane structures of the film to at least partially unfold or unwrinkle. As a consequence, the height of these structures decreases and/or the structures disappear partially or completely.

Releasing of a compacted or structured film thus causes an increase of the film extension in one of the two or both dimensions, which are large compared to the film extension in the remaining dimension. This appears as in increase of the surface of the film.

The term "releasable" as used herein means that the structured or compacted film, or parts thereof can undergo releasing as described above without destroying the assembly produced by the process of the invention and/or without destroying the porous film.

For example, releasing of a compacted or structured film may be caused by application of a gas pressure differential on the both sides of the assembly, so that the releasable parts of the film of the assembly are, in fact, released. Such a situation typically is given for assemblies used in vents.

Therefore, in particular the term "releasable" means that the compacted or structured film may be released upon application of a gas pressure differential on the sides of the assembly without that the assembly and/or the film is destroyed. The pressure differential threshold at which release of the releasable parts of the assembly occurs can be varied and adapted to the application of the assembly, as it, inter alia, depends on the nature of the particular porous film material used for forming the assembly and on the conditions for forming the assembly.

Releasing the structured or compacted film may also, for instance, be caused by applying a mechanical force to the film or part(s) of the film, or by application of heat.

In certain embodiments of the invention, step c) may comprise applying a support material to a part of the structured or compacted film so that the structured or compacted film is partially releasable. As used herein, the term "partially releasable" means that the structured or compacted film is releasable in a part to which no support material is attached and that the structured or compacted film is not releasable in a part to which support material is attached.

In certain embodiments of the invention, step c) is performed before step a) of the process of the present invention, or before step b) of the process of the present invention.

The present invention also provides an assembly obtainable by the process in any of its embodiments as described above.

The present invention furthermore provides an assembly comprising
  a) a structured or compacted porous film,
  b) a support material attached to a part of the structured or compacted porous film so that the structured or compacted film to which no support material is attached is releasable.

All embodiments as described herein for the process of the invention are also preferred embodiments of the assembly of the invention, where applicable. In particular, all embodiments of the structured or compacted porous film as described herein apply also as preferred embodiments in the assemblies of the invention, for example that the film may comprise, or consist of, any of the materials as described herein for the compacted or structured porous film, such as ePTFE, and the support material can be a stabilising support material or an elastomeric support material in any of the embodiments as described.

Preferably, in the assemblies of the invention the structured or compacted porous film comprises released sections. Released sections are sections of the film to which no support material is attached and which sections have, in fact, been released. Releasing is done as described above, for instance by applying a mechanical force such as stretching. This means that released sections of an otherwise structured film are at least partially unwrinkled or unfolded. In the released sections of an otherwise compacted film the bent fibrils are at least partially "straightened".

Preferably, a support material is attached to the released sections or to a part of the released sections. In case the support material is a stabilising support material, attachment of this stabilising support material shall permanently "freeze" the released structures of the film, i.e. stabilising or fixing the structures, making them rest permanently.

The present invention also relates to articles comprising the assemblies of the invention in any embodiment as described herein.

Preferably, the article is a vent, a valve, a filter, breathable housing or a deep drawing.

Especially in the application in a vent or filter the structured film shows significant advantages over a non-structured film. For example, due to the structuring of the porous film the effective surface area of the film for venting or filtering is strongly increased, while the required space of the vent or filter is not altered compared to a vent or filter comprising a non-structured film.

Preferably, the vent or valve comprises a sealing member. The sealing member is an area of the assembly which covers an opening of the vent or valve in the first closed state. The sealing member may be formed of the assembly alone or may comprise a further material adhered to, coated onto or otherwise attached to the assembly. The sealing member can have a flat shape and can, for instance, be rectangular or circular, such as a disc or a ring. The sealing member can be used to open and close an opening of the valve.

The sealing member preferably comprises, or consists of, the elastomeric support material. In a preferred embodiment, the sealing member is gas-tight and/or moisture-tight.

Preferably, the valve is a check valve. The principle of a check valve is well known in the art. In one embodiment of the check valve, the assembly comprises a structured or compacted porous film, an elastomeric support material attached to a part of the structured or compacted porous film and a sealing member. The assembly is placed onto an opening in such a way that the sealing member closes the opening. In this closed state of the valve, the elastomeric support material of the assembly is in its relaxed state. The sealing member prevents the release of e.g. air, water, water vapour and oils, from within the inner tube through the elastomeric support and structured or compacted porous film. Increasing the inlet pressure of the gases, such as air or water vapour, exiting the opening above the cracking pressure causes the elastomeric support material of the assembly to stretch and the sealing member is lifted from the opening. The valve is now in its open state and the elastomeric support material is in its stretched state. The cracking pressure is dependent on the elastic modulus of the elastomeric support. A higher elastic modulus requires a higher cracking pressure and vice versa. Accordingly, the cracking pressure of the check valve can be adjusted by selection of an elastomeric support material having an appropriate elastic modulus. If equilibrium between the inlet pressure and the surrounding pressure is reached, the elastomeric support material returns to its relaxed state, causing the sealing member to lower onto the opening, and shutting the valve again.

Preferably, the valve is a switchable valve. A switchable valve can switch between a first valve state and a second valve state. In the first valve state, only a first venting area is accessible for the gases and/or moisture to exit. In the second valve state, in addition to the first venting area a second venting area is accessible for the gases and/or moisture to exit. Consequently, the accessible venting area in the second valve state is higher than in the first valve state. Venting areas are those parts of the structured or compacted film not covered with elastomeric support material, i.e. these parts are permeable to gases and/or moisture. The second valve state may also include second venting areas having openings. Such openings allow the flow of fluids, including gases and liquids, from the inside to the outside of the valve through channels and does not require the passage of gases through the structured or compacted porous film. For instance, the expansion of the elastomeric support material in the second valve (or open) state, may cause such openings to become unsealed, or open access to such openings.

Accordingly, the flow rate of gases and/or moisture or the volumetric flow rate, usually expressed in litres/minute (l/min), is higher in the second valve state compared to the first valve state.

In one embodiment of this switchable valve, the assembly comprises a structured or compacted porous film, an elastomeric support material attached to a part of the structured or compacted porous film and a sealing member. The sealing member in this embodiment is in the form of a ring and is gas and/or moisture tight. The assembly is placed onto a circular opening in such a way that the ring is congruent with the edge of the opening. In the first valve state, only the parts of the structured or compacted film not covered with elastomeric support material within the sealing member ring and being positioned over the opening are permeable to gases and/or moisture and act as a first venting area. In this first state of the valve, the elastomeric support material of the assembly is in its relaxed state.

In the second state of the valve, the sealing member is lifted from the opening by e.g. increasing the inlet pressure of the gases and/or vapour exiting the opening causing the elastomeric support material of the assembly to stretch. In this second state, the switchable valve has a second venting area. This second venting area not only encompasses the first venting area as described above, but also the remaining parts of the structured or compacted film not covered with elastomeric support material outside the sealing member ring are accessible. The elastomeric support material is in its stretched state. Upon a decrease in inlet pressure, the elastomeric support material returns to its relaxed state, causing the sealing member ring to lower onto the opening. The valve is then in the first valve state again, and only the first venting area is accessible.

In another embodiment of a switchable valve, the assembly comprises a structured or compacted porous film comprising an elastomeric support material attached to a part of the structured or compacted porous film and a sealing member. The sealing member may be formed by an area of the assembly, such that no further material is required, or may comprise a further material, such as an elastomeric support material.

A sealing member comprising further material may be in the form of a disc or annulus and is gas and/or moisture tight. The assembly is placed onto a first opening of a valve substrate in such a way that the sealing member, such as a sealing annulus, is congruent with the edge of the first opening.

In the first valve state, only the parts of the structured or compacted film not covered with elastomeric support material, such as those parts within a sealing member annulus and being positioned over the first opening, or if the sealing member does not comprise a further material, those parts being positioned over the first opening, are permeable to gases and/or moisture and act as a first venting area. In this first state of the valve, the elastomeric support material of the assembly is in its relaxed state.

In the second state of the valve, the sealing member is lifted from the first opening by e.g. increasing the inlet pressure of the gases, liquids and/or vapour exiting the first opening causing the elastomeric support material of the assembly to stretch. In this second state, the switchable valve has a second venting area. This second venting area not only encompasses the first venting area as described above, but also the remaining parts of the structured or compacted film not covered with elastomeric support material outside the sealing member area as well as one or more second openings in the valve substrate. These one or more second openings connect the second venting area to the outside of the valve. Thus, the remaining parts of the structured or compacted film not covered with elastomeric support material outside the sealing member and the one or more second openings in the valve substrate become accessible. The elastomeric support material is in its stretched state.

Upon a decrease in inlet pressure, the elastomeric support material returns to its relaxed state, causing the sealing member to lower onto the first opening. The valve is then in the first valve state again, and only the first venting area is accessible.

In some embodiments the first opening may be in a protuberance from a base of the valve substrate. In other embodiments the first opening may be a channel in a base of the valve substrate.

In some embodiments the one or more second openings may be in the valve substrate, such as a base of the valve substrate, located in the second venting area. In other embodiments, the one or more second openings may be formed between the structured and compacted porous film and the valve substrate.

In other embodiments of this switchable valve, the sealing member can have other forms, such as a rectangular form, depending on the form or shape of the opening onto which the sealing member is placed.

The article comprising the assemblies of the invention in any embodiment as described herein is preferably a deep drawing. A deep drawing can, for instance, be obtained by thermoforming the assembly. The advantage of said deep drawings is not only their mechanical stability due to the applied support material, but the structured or compacted porous films impart at the same time unique intrinsic venting or filtering properties to the deep drawing. For instance, a deep drawing can have increased air and/or moisture flow.

The present invention further provides a process for the formation of a compacted porous film comprising
  a) application of a porous film onto an elastic substrate in a stretched state such that a reversible adhesion of the film on the stretched substrate occurs, and
  b) relaxing the substrate with the applied film thereon to obtain a compacted porous film.

Preferably, the process further comprises the application of a stabilising support material or an elastomeric support material to a part or whole of the compacted film.

All embodiments as regards the porous film, the elastic substrate and the support material as described hereinbefore are also preferred embodiments in this process of the invention.

Preferably, the substrate in step a) is stretched by a processing ratio of at least 110% in at least one direction.

Preferably, the elastic substrate is stretched by a processing ratio of at most 1100% in at least one direction.

Preferably, the substrate is uniaxially or biaxially stretched.

Preferably, the process further comprises removing the compacted film from the elastic substrate.

The present invention further relates to a compacted film obtainable by the process for the formation of a compacted film in any of its above described embodiments.

The present invention further relates to a compacted porous film comprising nodes and fibrils connecting the nodes, wherein the fibrils connecting nodes along a direction of compaction are bent and wherein the compacted porous film has an homogeneous increase in density over the whole film along the compacting direction.

The bending of the fibrils along a direction of compaction provides a homogeneous increase in density in that direction, particularly with respect to the corresponding porous film without compaction.

The embodiments as described above for the process or the assembly of the invention are also applicable to the compacted porous film. In particular, embodiments of the structured or compacted porous film described in relation to these embodiments apply also as preferred embodiments in the compacted porous film of the invention, for example that the film may comprise, or consist of, any of the materials as described herein for the compacted porous film, such as ePTFE.

The present invention further relates to articles comprising the compacted film in any of its above described embodiments.

Preferably, the article is a vent, a valve, a filter, a breathable housing or deep drawing.

An exemplary device for performing the structuring or compacting process as described above in a continuous manner comprises
  a) a moveable elastic substrate belt arranged such that at least a portion of the elastic substrate belt is transformed from a stretched to a relaxed state during movement of the belt, and
  b) a means to apply a film onto said elastic substrate belt in the stretched state such that adhesion of the film on the stretched substrate occurs
wherein the structured film is obtained through the transformation of the elastic belt from the stretched to the relaxed state with the film applied thereto.

In one embodiment of the device, the elastic substrate belt is a closed belt or tube, running on at least two rotatable rolls.

In such an embodiment, stretching in the machine direction can be effected by driving a first roll, on which the belt is running, with a higher surface velocity than a second roll on which the belt is running, too.

In a further embodiment of the device, stretching in the direction perpendicular to the moving direction of the belt, i.e. the transverse direction, is effected by means of pairs of clamps which are arranged opposed to each other so as to hold the belt at each of its sides and are moving with the belt, wherein the distance of the clamps in a pair is altered so that the width of the belt changes from a stretched to a relaxed state.

The clamps may be arranged so that they run in a rail along with the belt.

In a further embodiment of the device, at least one pressure roll is provided at a position where the belt is stretched which presses the film onto the stretched substrate belt, so as to effect adhesion of the film to the substrate.

Furthermore, the device may comprise means, e.g. a roll, on which the structured film is spooled after de-adhesion, i.e. removal, from the substrate belt.

Still further, the device may comprise means, e.g. a roll, from which a support material is supplied to the structured or compacted film.

The device may further comprise a heater through which the support material is pre-heated before it comes into contact with the structured or compacted film.

The present invention will be further illustrated by the examples described below, and by reference to the following figures.

Figure 29:
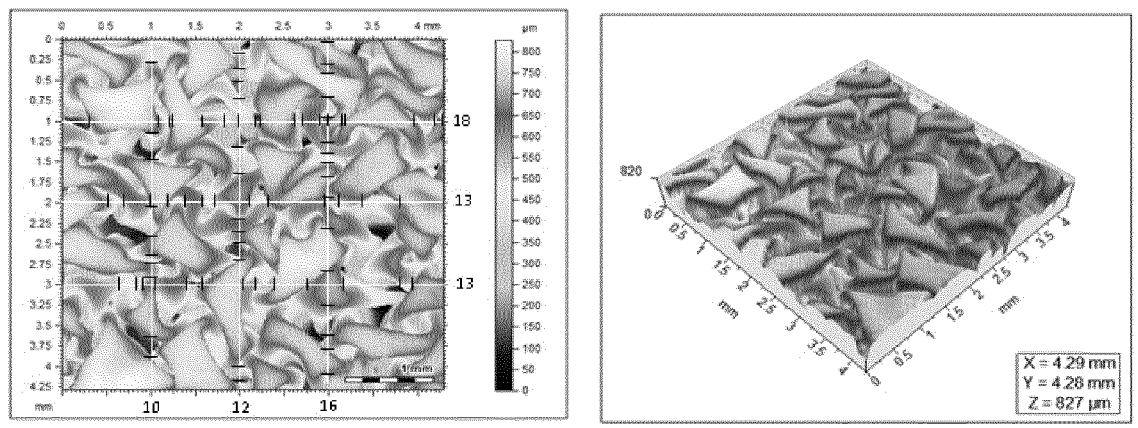

In FIG. 29, the determination of the structure density of the structured film of Example 5 is shown (left hand image). In the right hand image, a surface topography of the film is shown.

Figure 30:
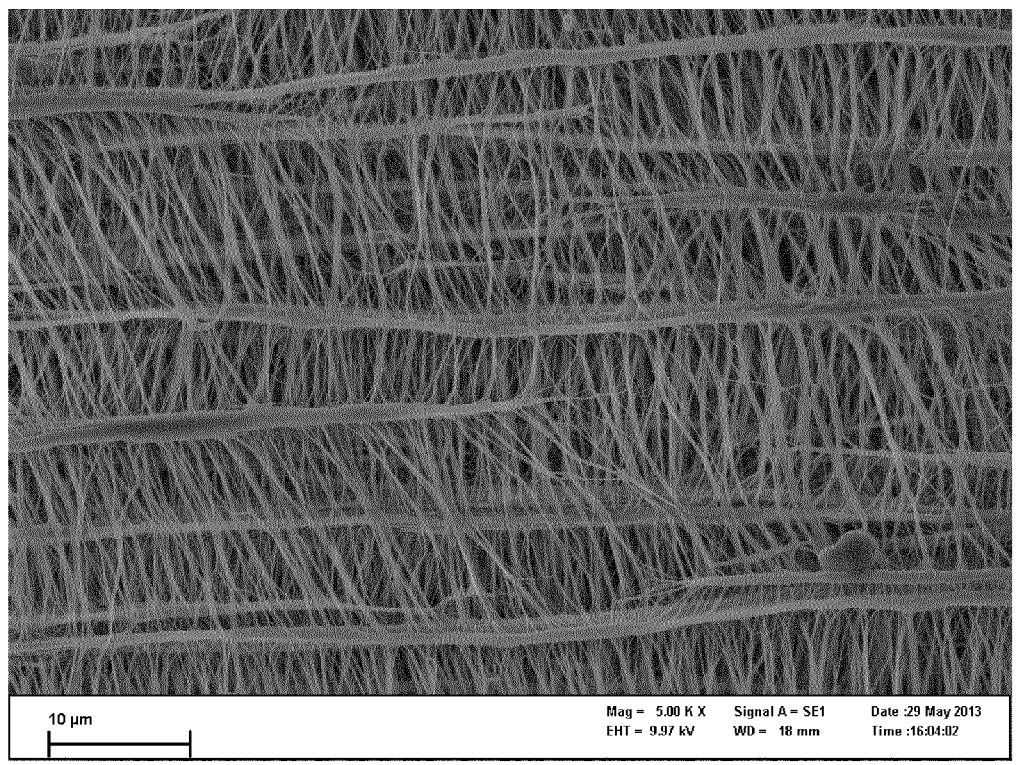

FIG. 30 is a SEM image (top view) of the reference film of Example 2A1.

Figure 31:
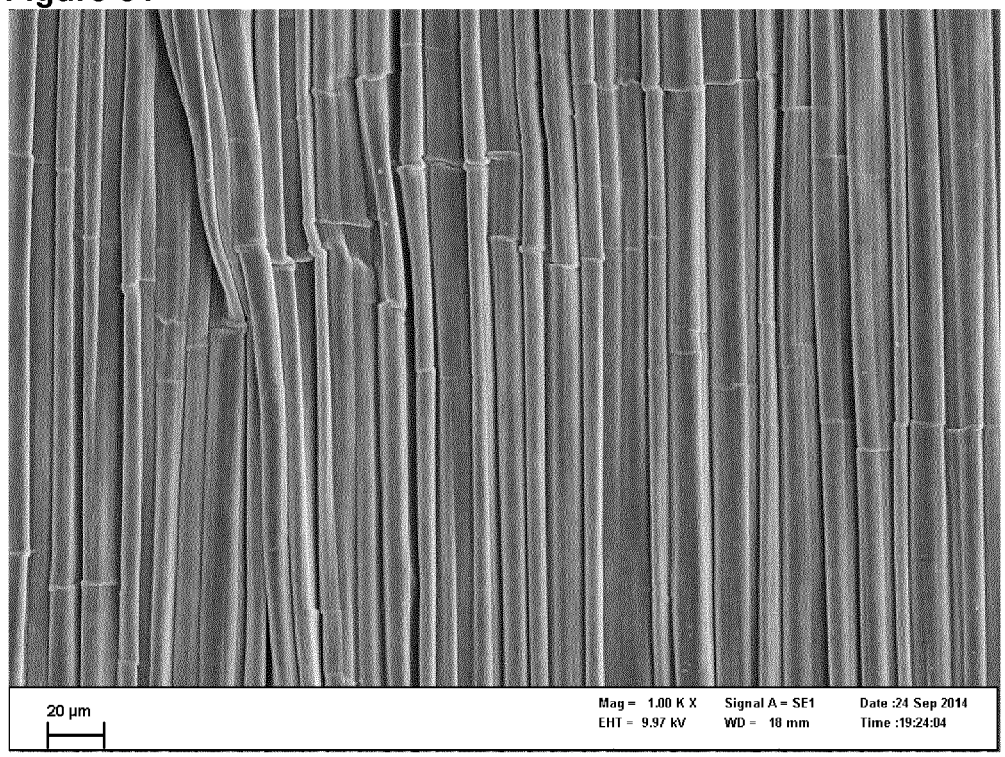

FIG. 31 is a SEM image (top view) of the structured film of Example 4D.

Figure 32:
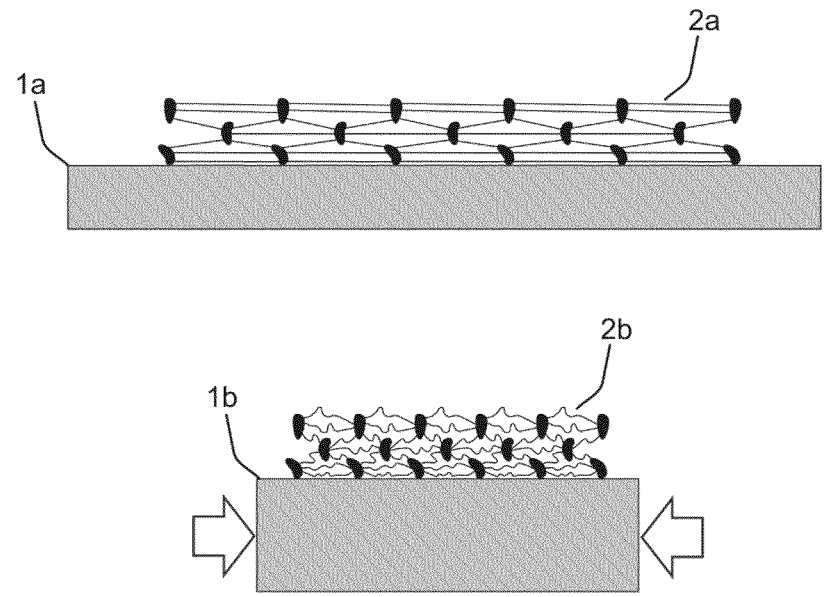

FIG. 32 is a schematic drawing showing the principle of compacting a porous film.

Figure 33:
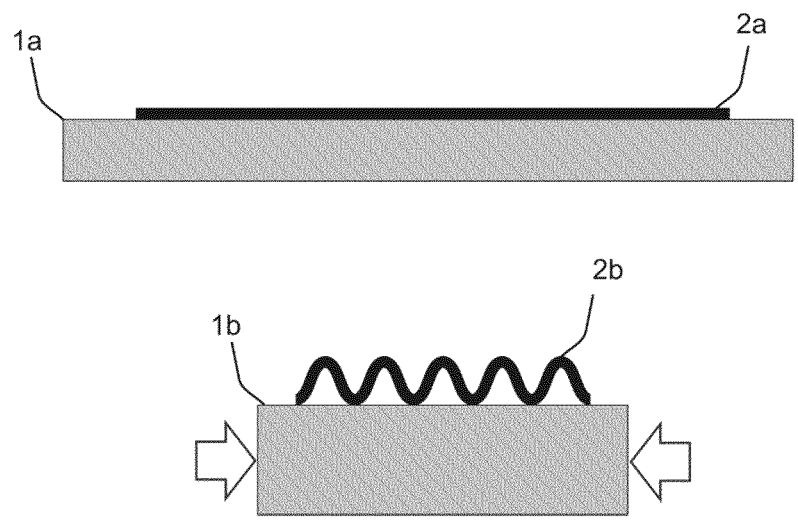

FIG. 33 is a schematic drawing showing the principle of structuring a porous film.

Figure 34:
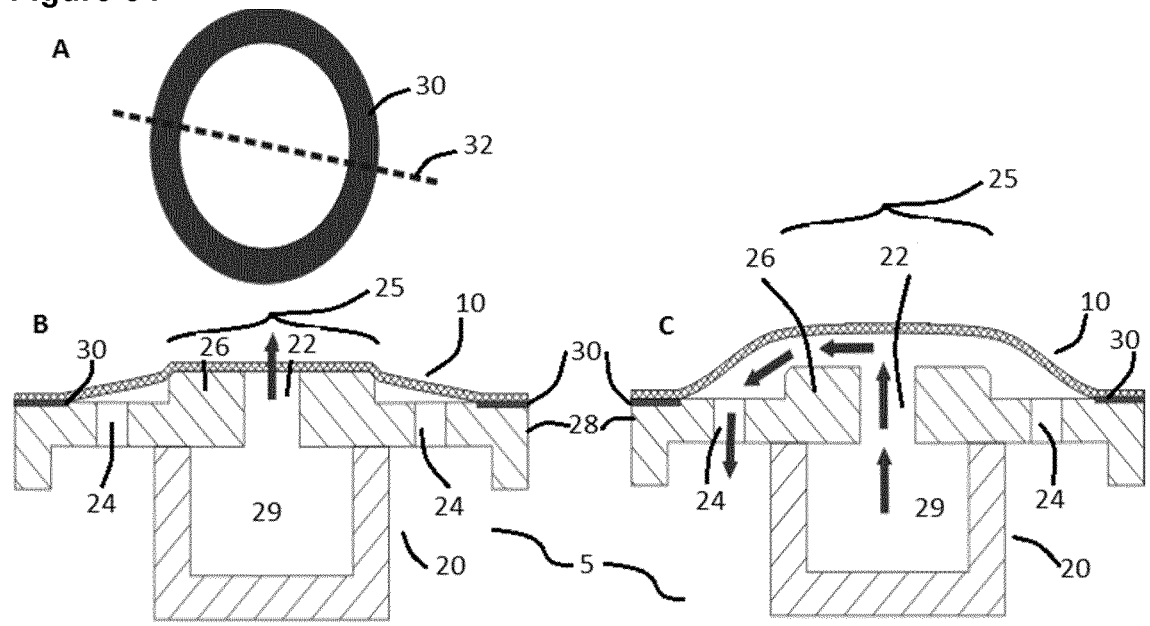

FIG. 34A is a schematic drawing of the bonding area of a switchable valve (Example 2B4). FIG. 34B is a schematic drawing of a switchable valve in its closed state. FIG. 34C is a schematic drawing of a switchable valve in its opened state.

Figure 35:
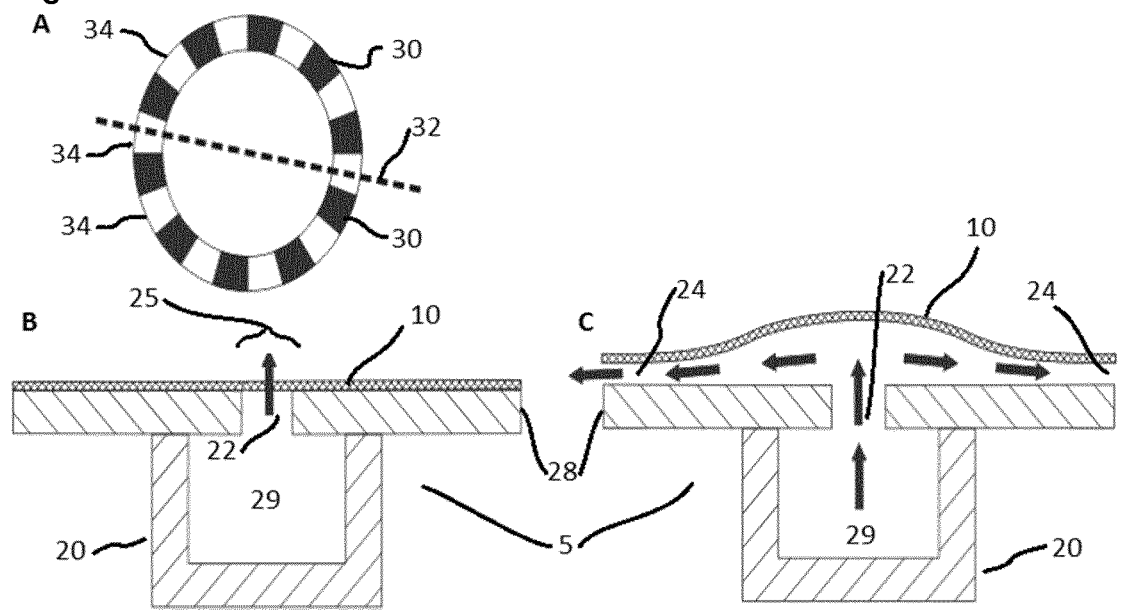

FIG. 35A is a schematic drawing of the bonding area of another switchable valve (Example 2B5). FIG. 35B is a schematic drawing of a switchable valve in its closed state. FIG. 35C is a schematic drawing of a switchable valve in its opened state.

Figure 36:
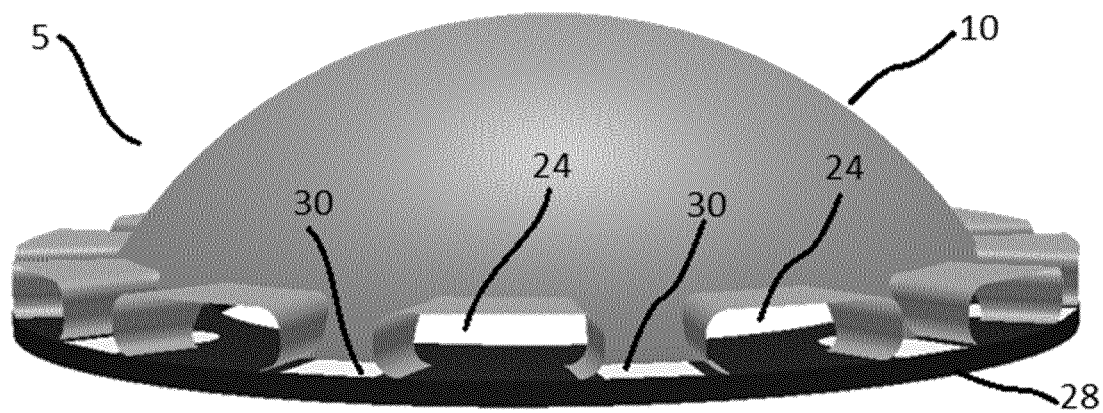

FIG. 36 is a schematic drawing of a three dimensional representation of an external view of the switchable valve of Example 2B5 in its open state.

MEASUREMENT METHODS a) Rigidity Measurements

Rigidity of the porous films may be measured according to ASTM D-2923-08, procedure B. Although this method is indicated to be suitable for polyolefin film, it may also be used for films made of other materials.

For measuring the rigidity, a Handle-O-Meter test device (Thwing-Albert Instrument Company) may be used.

b) ATEQ Airflow

Airflow is measured using an ATEQ airflow meter at a pressure of 70 mbar.

c) Gurley Number

Gurley numbers [s] were determined using a Gurley Densometer according ASTM D 726-58.

The results are reported in terms of Gurley Number which is the time in seconds for 100 cubic centimeters of air to pass through 6.54 $cm^2$ of a test sample at a pressure drop of 1.215 $kN/m^2$ of water.

d) Structure Height

Topography images were created with an areal confocal 3d measurement system "µsurf explorer" (Nanofocus AG). Such topographic images are e.g. given on the right hand side of FIG. 29.

The height of the structures is the maximum distance between a height peak and a height dip(valley) of a representative sample evaluated via image analysis.

e) Structure Density

To determine the structure density in x (e.g. transverse) direction and y (e.g. longitudinal or machine) direction, 3D topography or SEM images were analysed. Multiple measurements per axis are made and averaged out to determine structure density in perpendicular directions x and y.

Lines in x and y directions were applied on the images. All structure edges crossing a line were marked. Multiple measurements were taken and averaged. This procedure is depicted for the structured film of Example 5 in the left hand side pictures of FIG. 29.

The structure density where evaluated using following formula: (As 2 edges define one structure, the average edge number is divided by 2)

Structure density in direction $x$=(average number of edges $x$/2)/evaluated sample width $x$ Structure density in direction $y$=(average number of edges $y$/2)/evaluated sample width $y$ For example, this procedure yields for the structured film of Example 5 as shown in FIG. 29, left hand side, the following structure densities:

Direction $x$: (18+13+13)/3/2/4.29 mm=1.5/mm

Direction $y$: (10+12+16)/3/2/4.28 mm=1.5/mm f) Further Properties

Further properties, such as bubble point, water entry pressure, pore size, and porosity, were measured as indicated in US 2007/0012624, unless otherwise indicated.

EXAMPLES

A) Device

Example D1

Figure 1:
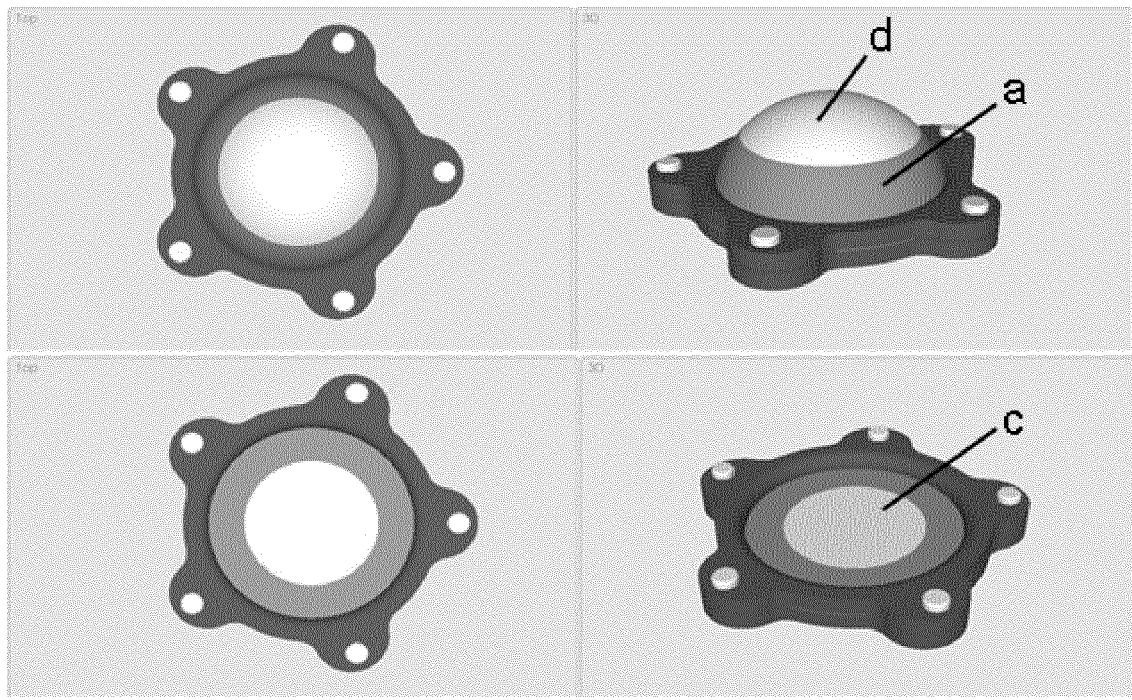
FIG. 1 show a schematic drawing of an exemplary device for performing the process of structuring a porous film involving biaxial stretching in a non-continuous manner.

FIG. 1 shows a typical and simple device for forming a structured film in a non-continuous manner, wherein an elastic carrier (a) is inflated to stretch the elastic carrier (a) and a film (d) is applied at a stretched state. The inner pressure is reduced by opening a valve and so that the substrate is relaxed and, thereby, the structured film (c) is formed on the elastic carrier (a).

Example D2

Figure 2:
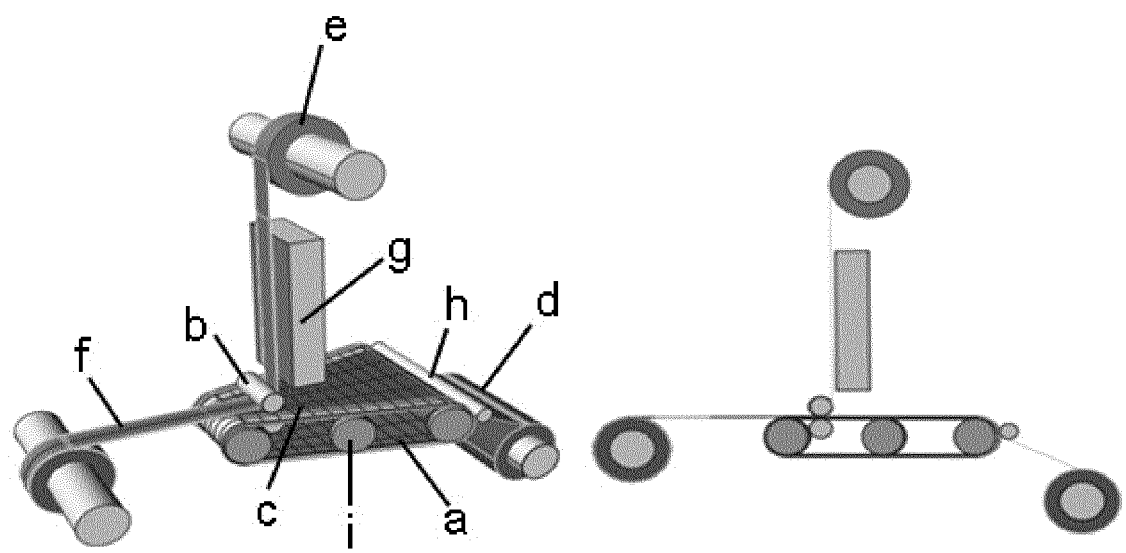
FIG. 2 shows a schematic drawing of a further exemplary device for performing the process of structuring or compacting a porous film involving uniaxial transverse stretching in a continuous manner.

FIG. 2 shows a schematic illustration of an embodiment of a continuous processing method and device for forming a structured or compacted film, wherein a rotatable elastic carrier belt (a) is fixed to two rotating elements that induce and release transverse stretch to the silicone substrate along a circular motion. A film (d) is applied via pressure roll (h) on the stretched elastic carrier belt (a). The film moves on the stretched elastic carrier belt (a) and a structured or compacted film (c) is formed during relaxation of the elastic carrier belt (a). Optionally, a support material (e) is pre-heated with e.g. an IR heater (g) and applied via pressure roll (b) on the structured or compacted film (c) to form a composite (f) comprising a structured or compacted film (c) and a support material (e).

Example D3

Figure 3:
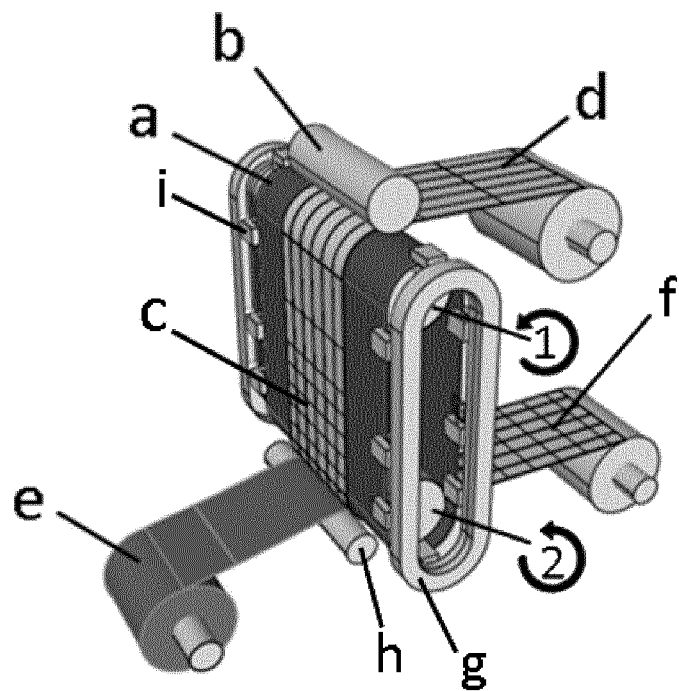
FIG. 3 shows a schematic drawing of a further exemplary device for performing the process of structuring or compacting a porous film involving uni- or biaxial stretching in a continuous manner.

FIG. 3 shows a schematic illustration of a further embodiment of a continuous processing method and device for forming a structured or compacted film, wherein a rotatable elastic carrier belt (a) rotates between two rolls with a surface velocity ratio.

To induce stretch in the elastic carrier (a) the surface velocity of roll 2 is lower than surface velocity of roll 1. This ratio causes the elastic carrier belt (a) to change its stretch state from relaxed to stretched during rotation. The elastic carrier (a) is fixed on the sides with clamps (i) that run in a rail (g) so that they can change their distance depending on the stretch ratio in the elastic carrier (a) where they are fixed to while keeping the elastic carrier (a) at a constant width.

In another version of this process the rails (g) form an angle so that the elastic carrier belt (a) is in addition to the longitudinal stretch, stretched in the transverse direction with changing its width repeatable during rotation.

A film (d) is applied on the stretched elastic carrier via pressure roll (b).

A structured or compacted film (c) is formed on the elastic carrier (a). A support material (e) is provided and laminated to the structured or compacted film (c) on the elastic carrier (a) via pressure roll (h) to form a composite material (f) comprising the structured or compacted film (c).

Example D4

Figure 4:
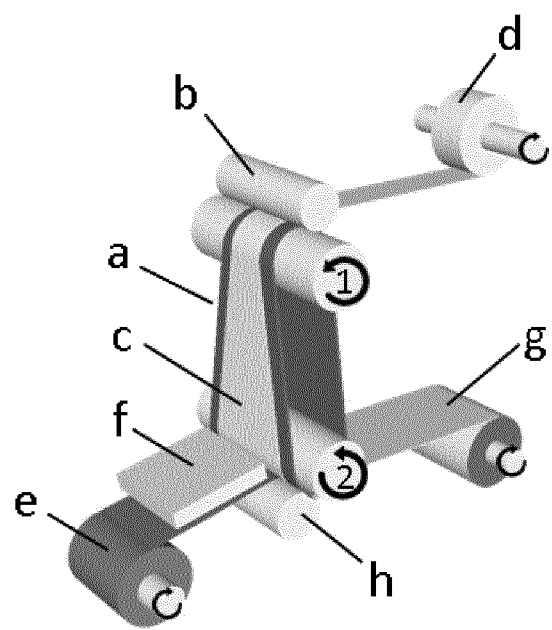
FIG. 4 shows a schematic drawing of a further exemplary device for performing the process of structuring or compacting a porous film involving biaxial stretching in a continuous manner.

FIG. 4 shows a schematic illustration of a further embodiment of a continuous processing method and device for forming a structured or compacted film, wherein a rotatable elastic carrier belt (a) rotates between two rolls with a surface velocity ratio.

To induce stretch in the elastic carrier (a) the surface velocity of roll 2 is lower than surface velocity of roll 1. This ratio causes the elastic carrier belt (a) to change its stretch state from relaxed to stretched during rotation.

A film (d) is applied on the stretched elastic carrier via pressure roll (b).

A structured or compacted film (c) is formed on the elastic carrier (a). A support material (e) is provided and preheated with an IR heater (f) to melt an adhesive component and laminated to the structured or compacted film (c) on the elastic carrier (a) via pressure roll (h) to form a composite material (g) comprising the structured or compacted film (c).

The elastic carrier (a) and consequently the film (d) in this process are contracted in the machine direction while an expansive force acts in the transverse direction depending on the Poisson's ratio of the elastic carrier material.

Example D5

Figure 5:
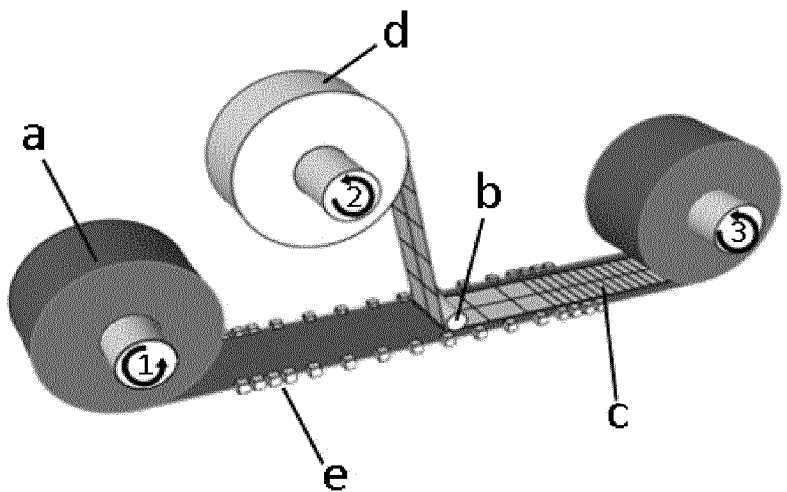
FIG. 5 shows a schematic drawing of a further exemplary device for performing the process of structuring or compacting a porous film involving uniaxial stretching in a continuous manner.

FIG. 5 shows a schematic illustration of a further embodiment of a continuous processing method and device for forming a structured or compacted film, wherein a roll of elastic carrier material (a) is provided. The roll is at least stretched in one direction, before the film (d) is applied with a pressure roll (b). In this case the elastic carrier is hold by clamps (e) on the sides and the clamps increase their distance in the machine direction to stretch the elastic carrier. After applying the film the stretch is released. A structured or compacted film (c) is formed on the elastic carrier. The clamps release the elastic carrier at the end of the process.

As shown in the image the elastic carrier with the structured or compacted film is spooled on a roll. This roll can then be used for further processes, e.g. a coating step, after which the elastic carrier is removed from the coated structured or coated compacted film. Another method would be to remove the structured or compacted film from the elastic carrier before the elastic carrier is spooled on a roll.

Example D6

Figure 6:
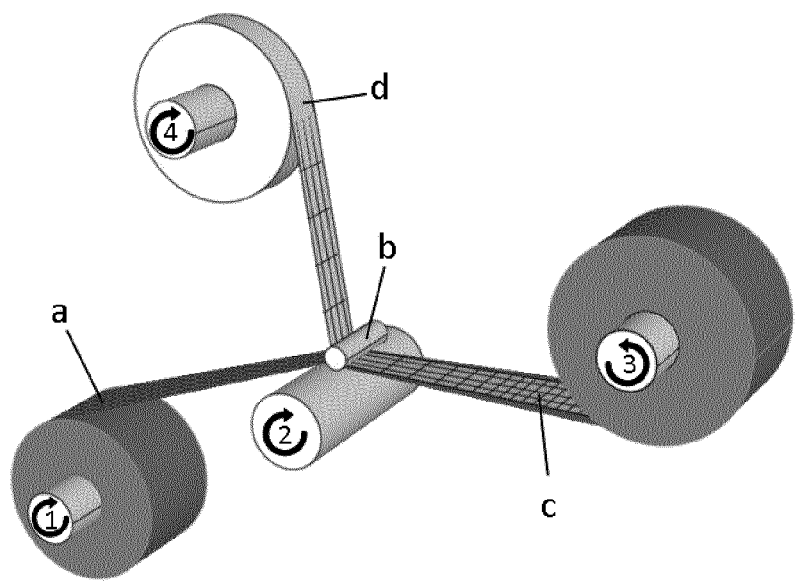
FIG. 6 shows a schematic drawing of a further exemplary device for performing the process of structuring or compacting a porous film involving uniaxial stretching in a continuous manner.

FIG. 6 shows a schematic illustration of a further embodiment of a continuous processing method and device of the invention wherein a roll of elastic carrier material (a) is provided. The roll is stretched in machine direction, before the film is applied. A ratio between the surface velocity of roll 1 and roll 2 stretches the elastic carrier (a). A film (d) is applied on the stretched elastic carrier via pressure roll (b). The stretch is released, with roll 3 having a lower surface velocity than roll 2, to form a structured or compacted film (c). Usually surface velocity of roll 1 equals approximately the surface velocity of roll 1. The elastic carrier (a) and consequently the film (d) in this process are contracted in the machine direction while an expansive force acts in the transverse direction depending on the Poisson's ratio of the elastic carrier material.

B) Process/Structured and Compacted Porous Film

The principle of compacting or structuring a film is described first.

The principle of compacting a porous film according to the invention is shown in FIG. 32. A porous film (2a) having straight fibrils connecting the nodes is applied to a stretched elastic substrate (1a) so that reversible adhesion of the film on the stretched substrate occurs, see upper part of FIG. 32. Upon uniaxially relaxing the substrate with the applied film thereon, the fibrils of the film bend and the density of the porous film increases. The lower part of FIG. 32 shows the so obtained compacted film (2b) on the elastic substrate (1b) in its relaxed state.

The principle of structuring a porous film according to the invention is shown in FIG. 33. A porous film (2a) is applied to a stretched elastic substrate (1a) so that reversible adhesion of the film on the stretched substrate occurs, see upper part of FIG. 33. Upon uniaxially relaxing the substrate with the applied film thereon, the film partially delaminates from the substrate and out-of-plane structures occur. The lower part of FIG. 33 shows the so obtained structured film (2b) on the elastic substrate (1b) in its relaxed state. The structured film (2b) shows wrinkles and foldings.

Example 1

Example 1A

An ePTFE membrane was made by processes known in the art for example U.S. Pat. No. 3,953,566. The membrane had an average ATEQ airflow of 120 l/hr (at 70 mbar test pressure), a WEP (Water Entry Pressure) of 1.75 bar, a thickness of 80 μm, a mass/area of 25 g/m$^2$.

In Example 1A, a PDMS(polydimethylsiloxane) sheet (Elastosil RT620, Wacker silicones) was used as elastic substrate. The membrane was adhered to the prestretched PDMS sheet with slight pressure. The PDMS sheet was biaxially relaxed at a processing ratio of 200% (2:1 biaxially; 4:1 areal change) with the adhered film thereon, thereby obtaining a compacted film.

Figure 7:
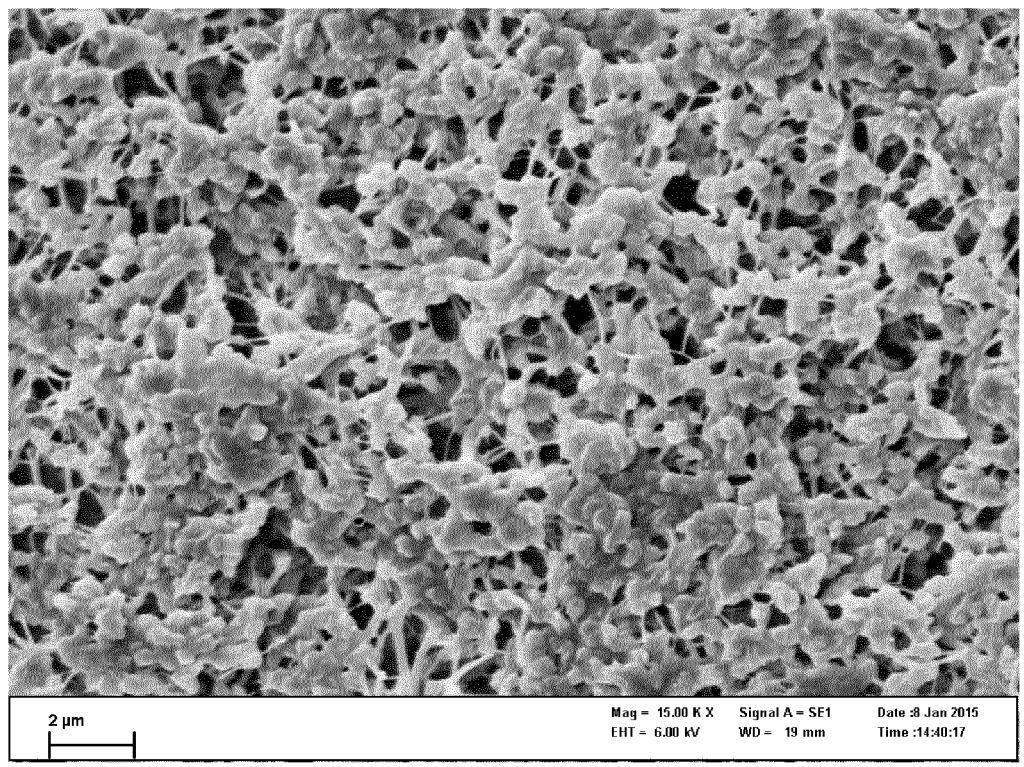
FIG. 7 shows a SEM image of a top view of the compacted film of Example 1A.
Figure 8:
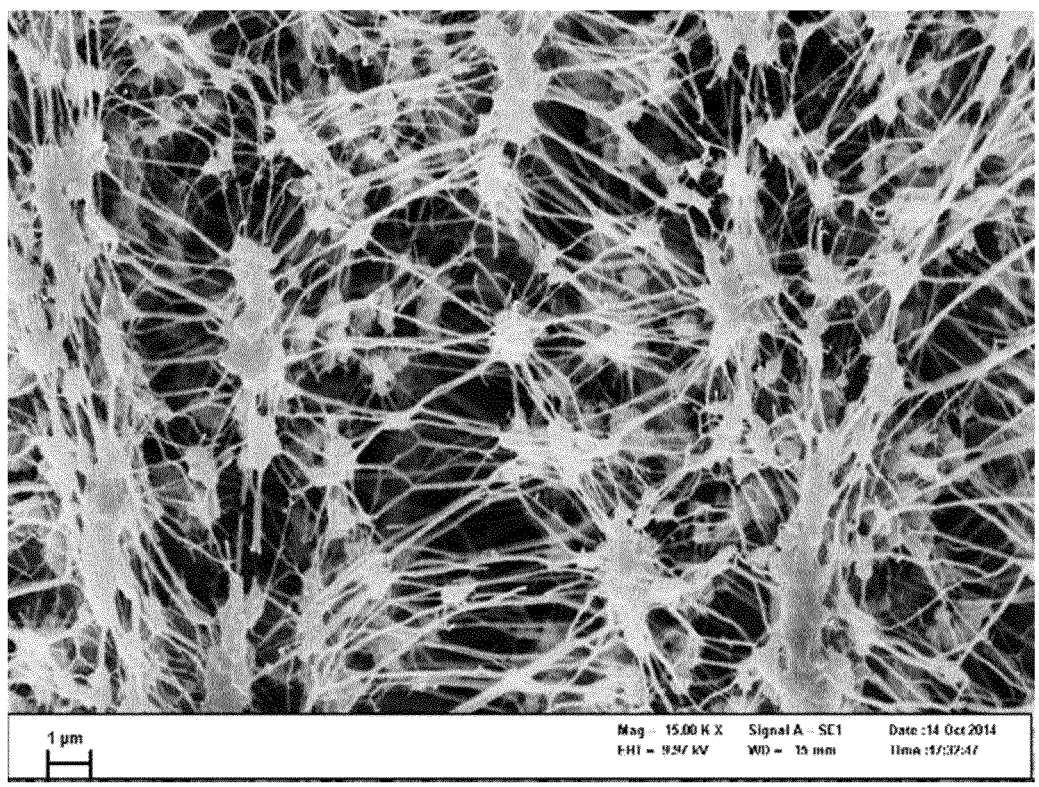
FIG. 8 shows a SEM image (top view) of the initial, untreated film used in Example 1A.

The microstructure or intra-film structure changed as can be seen in FIG. 7. For comparison, the initial, untreated membrane having nodes and "straight" fibrils is shown in FIG. 8.

This film has a low density and is very soft so that it will not delaminate from the elastic substrate upon relaxation up to about 250% in biaxial relaxation.

Example 1B

Example 1B is an example of a film assembly. The film composite of Example 1A was bonded to a polypropylene extruded knit material acting as stabilising support material in a heat press at a temperature of 185° C., 4 bar pressure using a SEFA mini heat press with 160 mm×160 mm press area for 10 s. The heated side of the press was faced to the polypropylene knit side. After cooling the elastic substrate was removed from this composite material.

For releasing a part of the compacted film, the composite material was clamped in a 10 mm diameter circular molding tool. A hot air gun set to 200° C. and low fan speed was used to melt the polypropylene support structure. A vacuum was applied from the lower side to mold the composite material to form a spherical shape.

Figure 9:
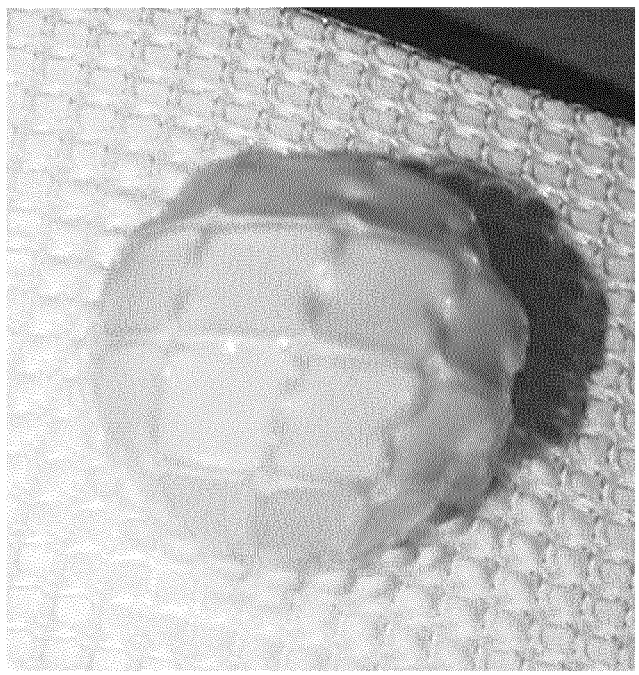
FIG. 9 shows an image of a molded film assembly being stabilized on a polypropylene knit of Example 1B.
Figure 10:
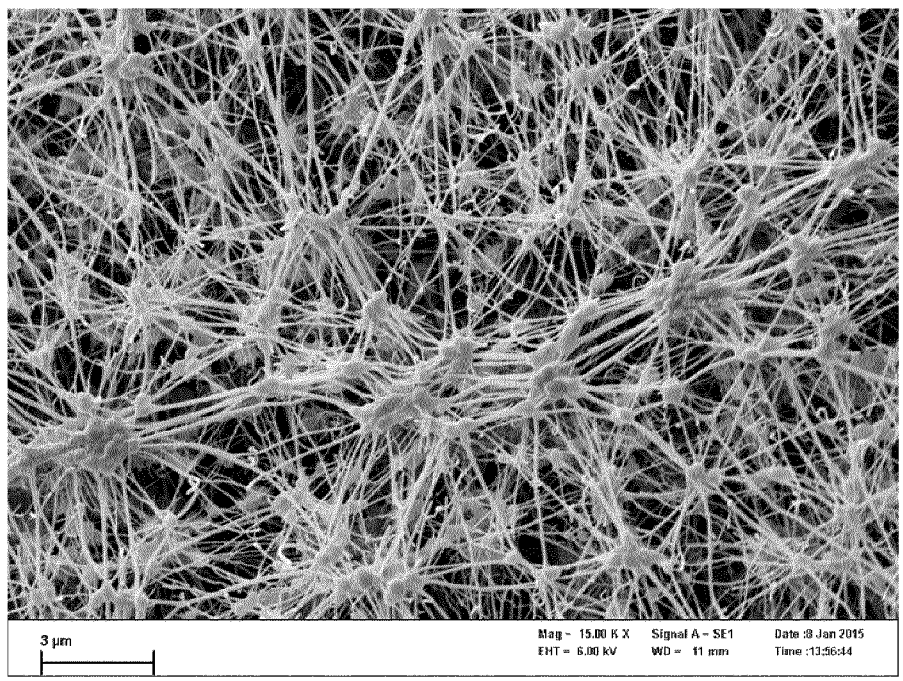
FIG. 10 is a SEM image (top view) of a released part with "straightened" fibrils on top of the molded shape shown in FIG. 9.
Figure 11:
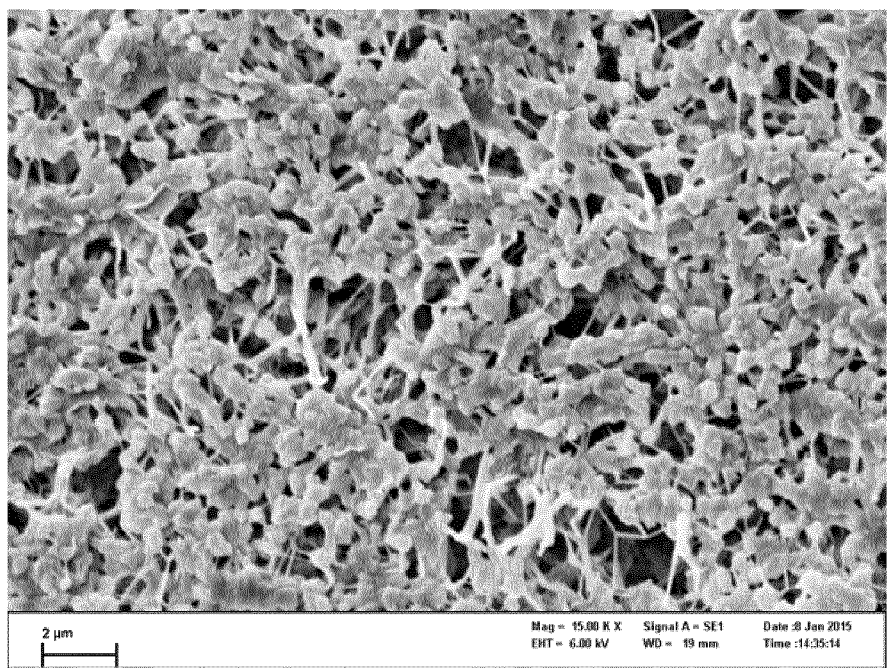
FIG. 11 is a SEM image (top view) of the compacted, non-released part of the film of FIG. 9.

FIG. 9 shows a molded film assembly being stabilized on the polypropylene knit. FIG. 10 shows a released part on top of this molded shape with "straightened" fibrils, whereas FIG. 11 shows an unmolded area, i.e. the still compacted, non-released part of the film.

Example 1C

Example 1C is an example of a molded vent comprising the film assembly of the invention. A Polyethylene Nonwoven material was applied in a heatpress at 130° C. for 2 s at 2 bar to the membrane.

Figure 12:
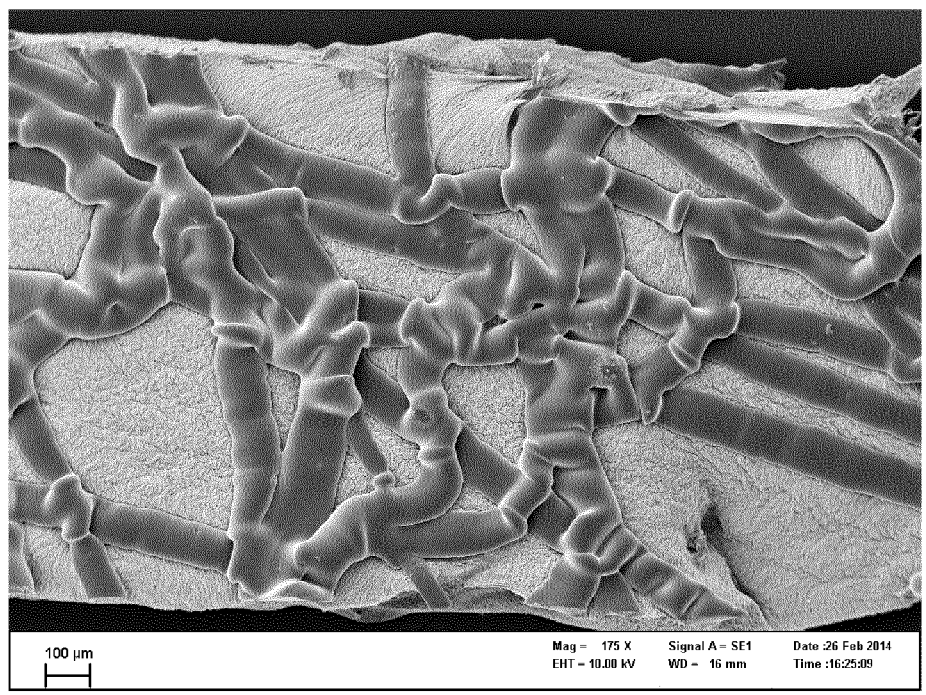
FIG. 12 is a SEM image showing a top view of the compacted film of Example 1C with a PE nonwoven on top.

The membrane with the PE nonwoven was adhered to a prestretched PDMS sheet (Elastosil RT620, Wacker silicones) with slight pressure, the Nonwoven side facing outside. The elastic substrate and adhered film were heated to about 130° C. with an IR heater arranged about 15 cm above the elastic substrate. The PDMS sheet was biaxially relaxed at a processing ratio of 200% (2:1 biaxially, 4:1 areal change) with the adhered film there on. The microstructure or intra-film structure of the obtained compacted film changed. The nonwoven material did flow on the film and after cooling the nonwoven stabilized the compacted film, so that it could be removed from the elastic substrate. FIG. 12 shows the compacted film with the PE nonwoven on top.

The composite material was cut out in circles and bonded to a plastic disc with a circular hole with 2 mm diameter. The disc was clamped in a molding tool. For releasing a part of the compacted film, a hot air gun set to 160° C. and low fan speed was used to melt the nonwoven material. A vacuum was applied from the lower side to mold the composite material to form a spherical shape.

As a reference example, the membrane was used untreated and bonded to a plastic disc with a 2 mm circular hole.

Figure 13:
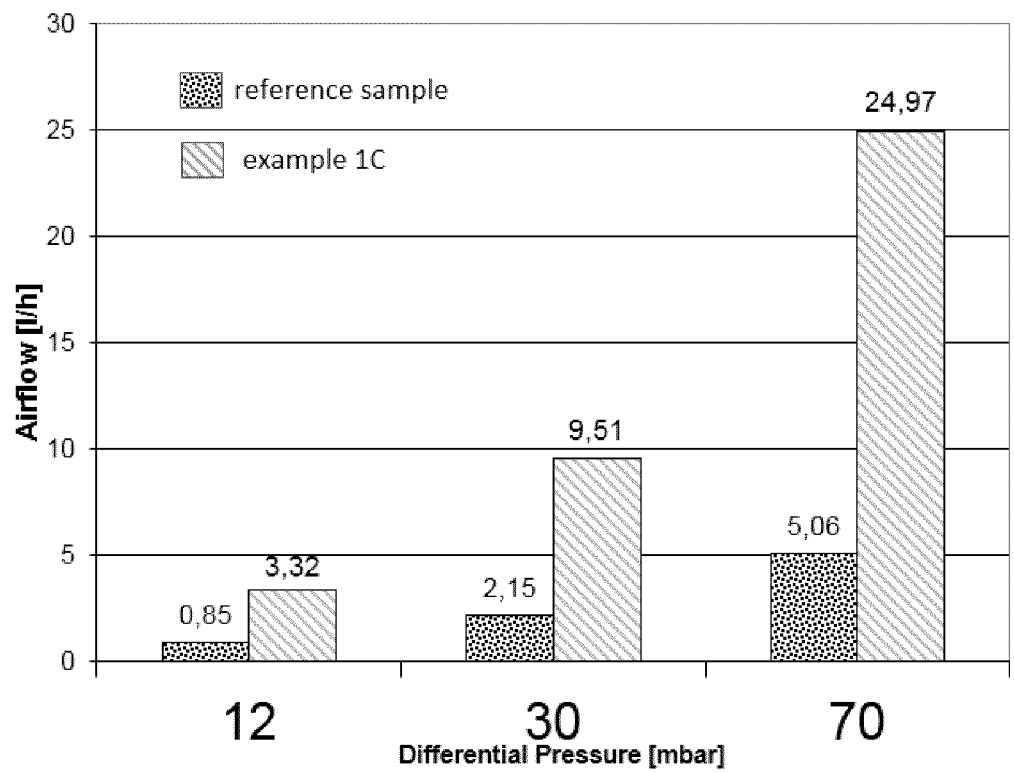
FIG. 13 is a graph showing the airflow values measured with an ATEQ device at different pressures (Reference Example and Example 1C).

The water entry pressure was 1.75 bar for both samples, so it can be seen that the compacting and molding did not damage the film pore structure. The airflow was measured with an ATEQ device at different pressures as can be seen FIG. 13. The airflow was increased up to 5 times using a film assembly according to the invention ("3d") in comparison to the reference example ("flat").

Example 2

An ePTFE membrane was made by processes known in the art for example U.S. Pat. No. 5,814,405 or DE 69617707. The membrane had an average ATEQ airflow of 54 l/hr (at 12 mbar test pressure), a WEP (Water Entry Pressure) of 28 psi (1.93 bar), a bubble point of 8.2 psi (0.57 bar), an average Gurley number of 2.8 Gurley seconds and a mass/area of 10 g/m$^2$. The membrane had an average transverse direction rigidity of 29.7 g/m and average machine direction rigidity of 9.8 g/m, measured according to ASTM D2923-08 Method B, using a Handle-O-Meter test device (Thwing-Albert Instrument Company) at 20° C.

Examples 2B and 2C are examples of a film assembly comprising a structured film. In examples 2A, 2B and 2C, a Bicomponent Copolyester Spunbond was used as support material. To adhere the support material to the membrane samples a polyurethane hot melt web adhesive (Article Number: D6C8F 10 g/m$^2$; Company: Protechnic (France)) was used. The web adhesive was pre-applied to the support material in a heat press at 120° C. and 5 psi (0.34 bar) areal pressure at 15 seconds dwell time.

In Examples 2B and 2C, different processing types as indicated have been used.

Examples 2D and 2E are examples of a film assembly comprising a compacted film. In examples 2D and 2E, the membrane was adhered to the elastic substrate with slight pressure. The elastic substrate was relaxed in longitudinal direction at different ratios. No visible out-of-plane structures occurred as evidenced by a structure density of 0.0/mm in both x and y direction, but only the fibrils folded. No delaminating of the compacted membrane from the elastic substrate occurred upon relaxation in longitudinal direction.

Process conditions and results are given in Table 1 below.

TABLE 1

|  | 2A (reference) | 2B | 2C | 2D | 2E |
|---|---|---|---|---|---|
| Processing type | — | Biaxial | Transverse | Longitudinal | Longitudinal |
| Processing ratio [%] | 100 | 200 | 200 | 350 | 200 |
| Processing temperature [° C.] | 20 | 20 | 20 | 20 | 20 |
| Elastic substrate | — | Elastosil RT 620 | ECOFLEX 0010 | Elastosil RT 620 | Elastosil RT 620 |
| Elastic substrate surface | — | smooth | smooth | smooth | smooth |
| Structure density direction x | — | 4.4/mm | 7.5/mm | 0.0/mm | 0.0/mm |
| Structure density direction y | — | 0.6/mm | 0.0/mm | 0.0/mm | 0.0/mm |

Example 2B1

The structured film of example 2B was coated with an elastomeric support material to form a film assembly. A 100 micron paper was lasercut with slots of 100 micron width and about 1 mm distance. Wacker Elastosil RT 620 Silicones component A and B were mixed at a mass ratio of 9:1 and the material was pressed through the slots of the paper. The material was cured in an oven for 3 min at 80° C.

A $2^{nd}$ similar line coating with Elastosil RT 620 was applied rectangular to the first line coating to form a grid coating. After coating the structure was cured again at 80° C. for 3 min.

Figure 14:
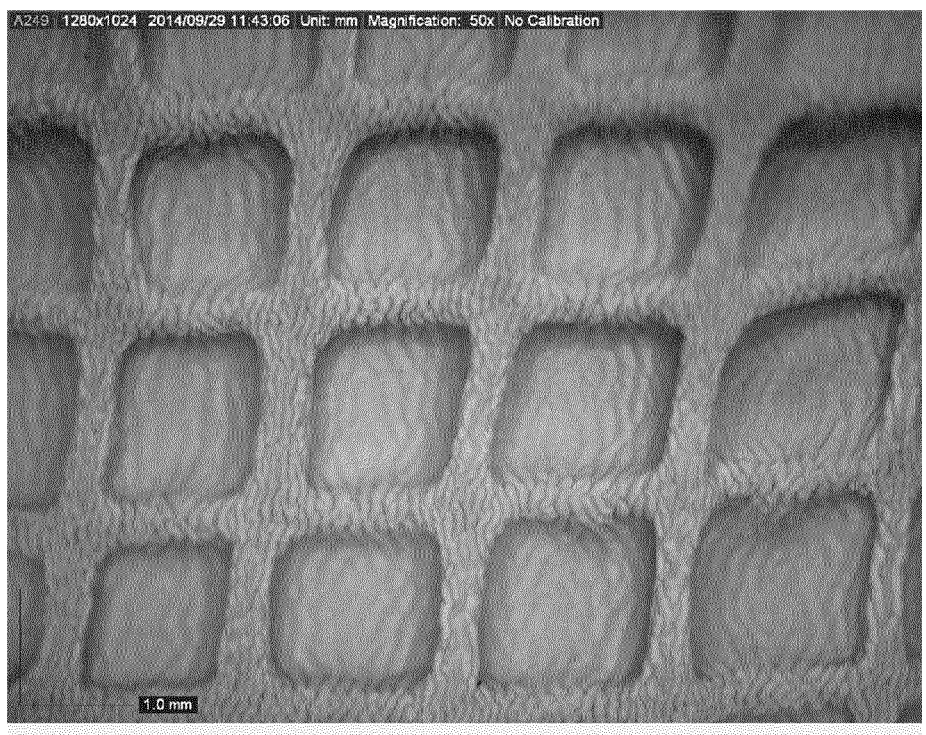
FIG. 14 shows released parts of the structured film occurring between the elastomeric grid lines after the first stretch cycle (Example 2B1).

FIG. 14 shows released sections of the structured film occurring between the elastomeric grid lines after the first stretch cycle (releasing). The released section of the structured film form periodic, released structures on the otherwise structured film.

Figure 15:
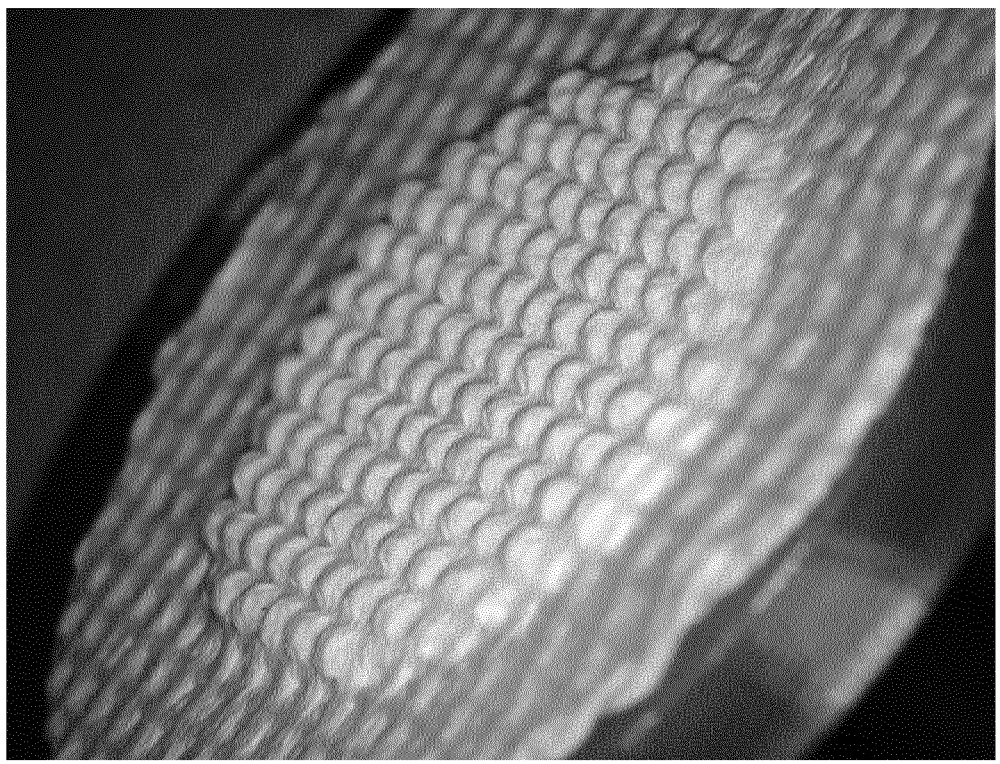
FIG. 15 shows a vent in its flat state upon applying a low air pressure (Example 2B1).
Figure 16:
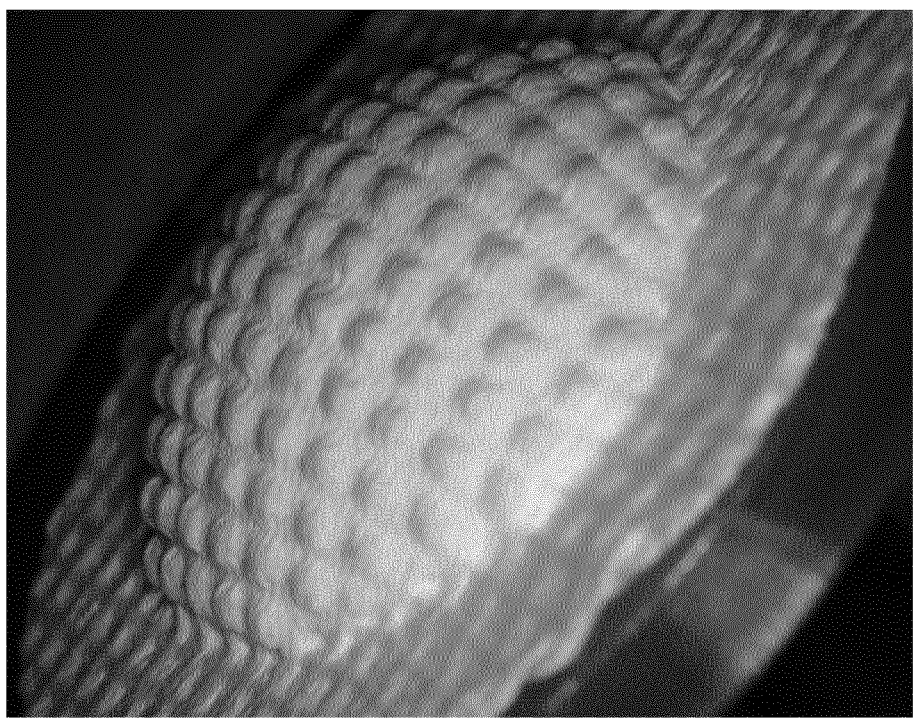
FIG. 16 shows the vent of FIG. 15 upon applying medium air pressure.
Figure 17:
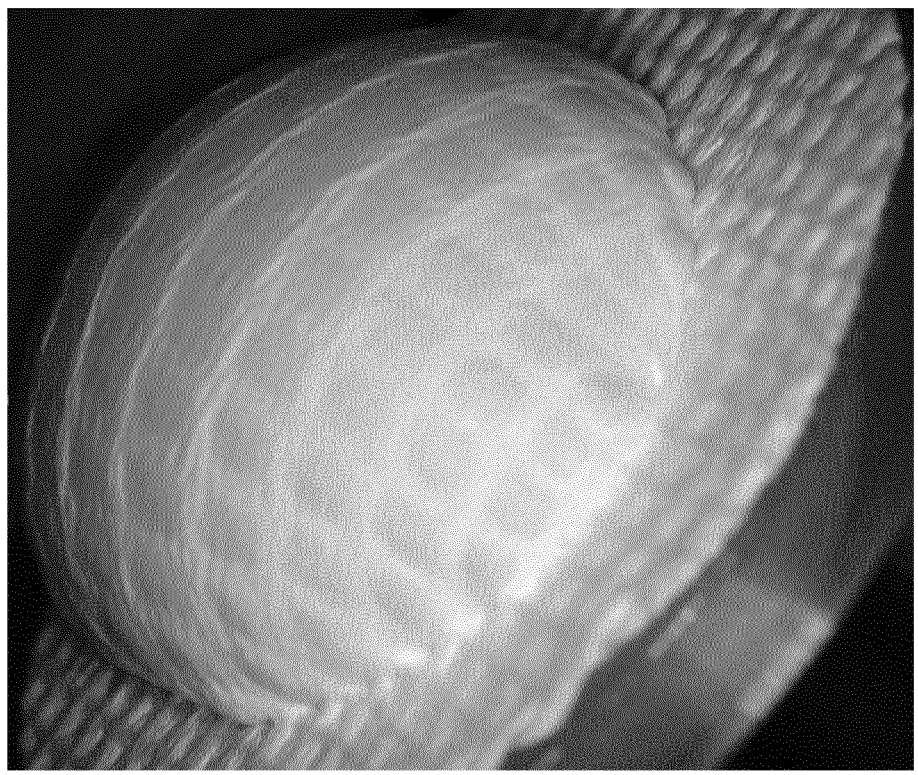
FIG. 17 shows the vent of FIG. 15 upon applying high air pressure.

The film of Example 2B1 was assembled onto a circular air nozzle and used as a vent. FIG. 15 shows the vent in its flat state upon applying a low air pressure. Applying medium and high air pressure imparts a spherical shape to the film assembly as seen in FIGS. 16 and 17.

Example 2B2

The structured film of example 2B was coated with an elastomeric support material to form a film assembly. A 100 micron paper was lasercut with slots of 100 micron width and about 1 mm distance. Wacker Elastosil RT 620 Silicones component A and B were mixed at a weight ratio of 9:1 and the material was pressed through the slots of the paper. The material was cured in an oven for 3 min at 80° C.

A $2^{nd}$ similar line coating with Elastosil RT 620 was applied rectangular to the first line coating to form a grid coating. After coating the structure was cured again at 80° C. for 3 min.

An additional circular elastomeric coating with Elastosil RT 620 was applied on the sample through a lasercut circle on a 100 micron thick paper.

Figure 18:
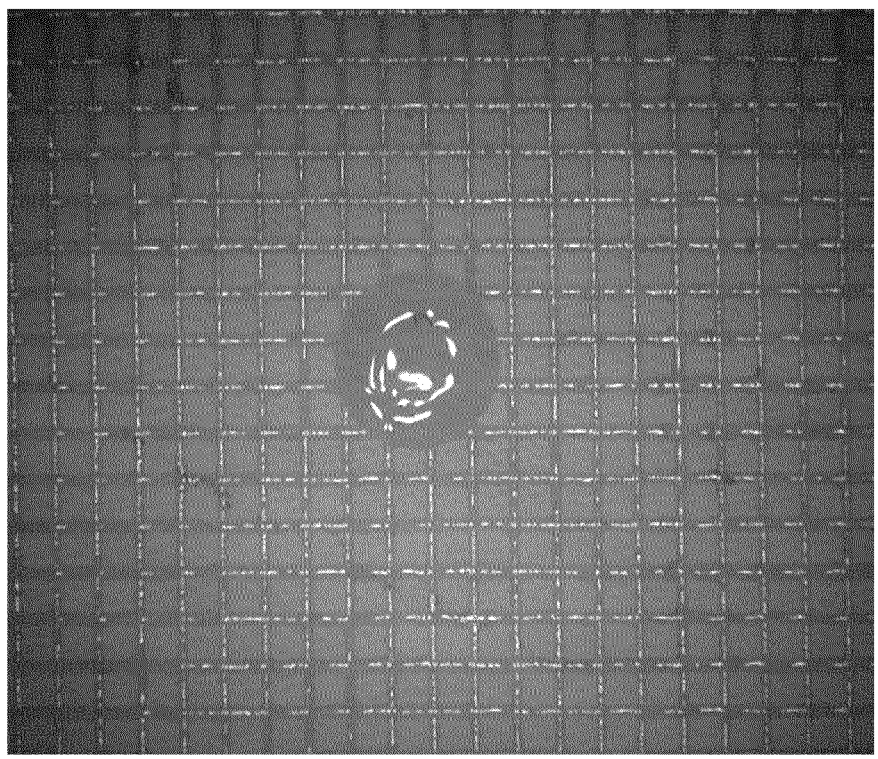
FIG. 18 is an image of the film assembly of Example 2B2 having an elastomeric support material in the form of a grid coating. In the centre of the film assembly an additional circular elastomeric coating as sealing member is seen.

FIG. 18 shows the obtained film assembly comprising an elastomeric support material in the form of a grid coating and in the centre of the film assembly an additional circular elastomeric coating as sealing member.

Example 2B3

The film assembly of Example 2B2 was circularly cut out and bonded to a plastic disc with 10 mm opening and having an inner tube. The film assembly was placed onto the plastic disc in such a way that the sealing member was congruent with the opening of the inner tube, thereby forming a check valve. A schematic drawing of this check valve is shown in FIG. 19.

Figure 19:
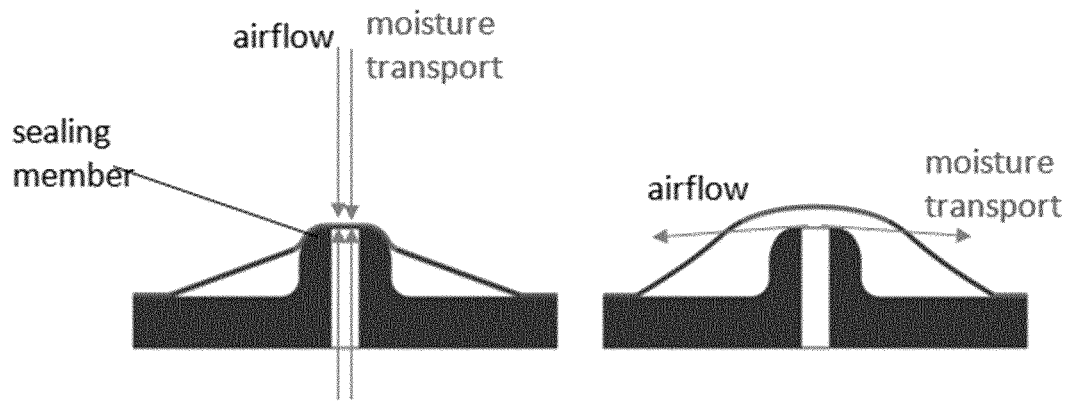
FIG. 19 is a schematic drawing of a check valve (Example 2B3).
Figure 20:
FIG. 20 is an image of a check valve in its closed state (Example 2B3).
Figure 21:
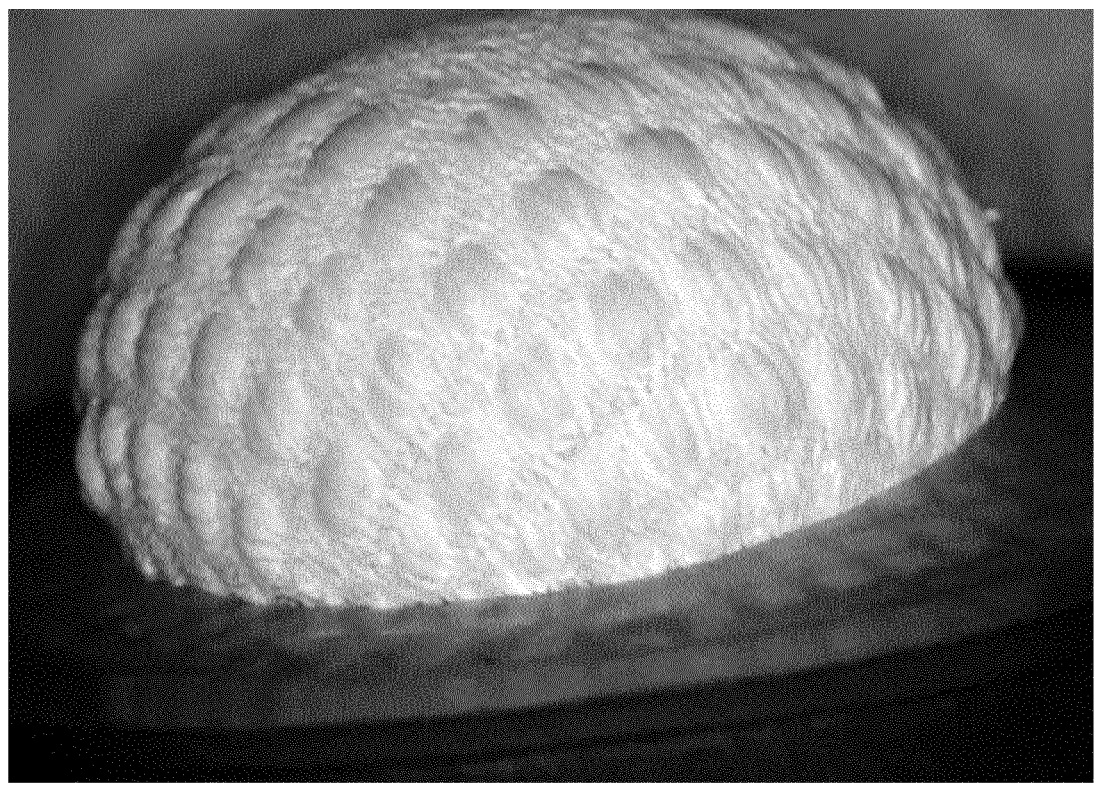
FIG. 21 is an image of a check valve in its open state (Example 2B3).
Figure 22:
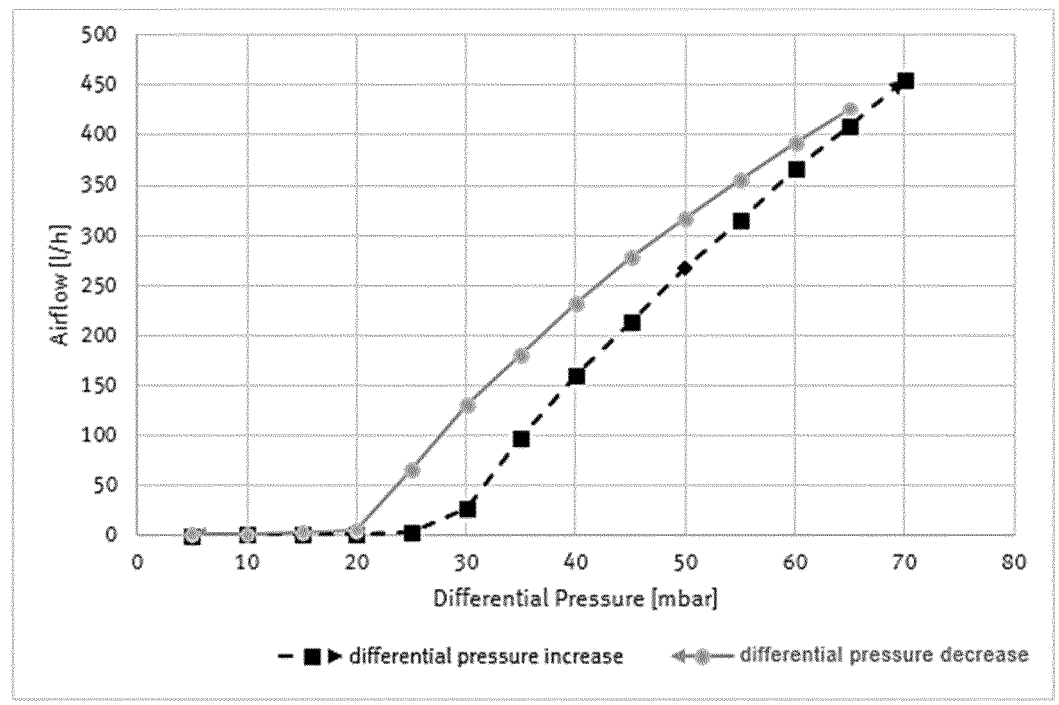
FIG. 22 is a diagram indicating the differential pressure at which the check valve of Example 2B3 is in its open or closed state.

The closed state of the valve is shown on the left hand side of FIG. 19. The elastomeric support material is in its relaxed state and the sealing member closes the opening of the tube, see also FIG. 20. From the outside to the inside, when the vent was closed, the penetration of e.g. water, water vapour and oils, into the inner area was prevented. From the inside to the outside the vent is closed by the elastomeric coating forming the sealing member over the inner tube, preventing the release of e.g. air, water, water vapour and oils, from within the inner tube. This is shown in the left hand drawing of FIG. 19, in which the arrows representing airflow and moisture transport do not cross the sealing member part of the film assembly. Increasing the inner gas pressure causes the film assembly to stretch. From the inside, once a desired pressure is reached the sealing member is lifted from the opening of the tube and the vent opens to equilibrate pressure, see right hand side of FIG. 19. As can be seen from FIG. 22, if the difference between the inner and outer pressure in this example is higher than 20 mbar, the vent opens. The open state of the vent can also be seen from FIG. 21. The elastomeric support material is then in its stretched state. Air and/or moisture, for instance, may flow from the interior of the valve through venting areas adjacent to the sealing member and through the parts of the film assembly not covered by the sealing member to the outside. If equilibrium in pressure is reached, the elastomeric support material returns to its relaxed state, causing the sealing member to lower onto the opening of the tube, and closing the valve again.

Example 2B4

The film assembly of Example 2B1 was circularly cut out and bonded to a valve substrate to provide a switchable valve. FIG. 34A shows the bond area 30 at the perimeter of the circular film assembly, which was continuous around the entire perimeter of the circular film assembly, to a valve substrate. FIGS. 34B and C show the cross-section of the switchable valve at plane 32 of FIG. 34A.

Referring to FIG. 34B, film assembly 10 was attached to the base 28 of a valve substrate 20 at the bond area 30. The valve substrate may be a plastic material, such as a molded plastic. The bond area 30 attached the elastomeric support material of the film assembly to the base 28 of the valve substrate 20. The elastomeric support material was on the face of the film assembly 10 directed inward towards and adjacent to the valve substrate 20 and the structured or compacted film was on the opposite side facing outward from the valve substrate.

The valve substrate 20 had a first opening 22 and second openings 24. The first opening 22 can be formed by a tube inserted into the valve substrate. Alternatively, the valve substrate 20 may be molded to provide first opening 22 as a channel through a protuberance 26 which projects from the base 28 of the valve substrate as shown in FIGS. 34B and C. The film assembly 10 was bonded onto the base 28 of the valve substrate 20 in such a way that a portion of the film assembly was congruent with the surface of protuberance 26 surrounding the first opening 22 and through which opening 22 emerges, thereby forming a sealing member 25 over first opening 22 to provide a switchable valve 5.

The closed state of the switchable valve is shown in FIG. 34B. The elastomeric support material was in its relaxed state and the film assembly 10 was located adjacent to and in contact with the protuberance 36 closing the first opening 22. From the outside to the inside, when the vent was closed, the penetration of e.g. liquid water, water vapour and oils, through the film assembly 10 into the inner area 29 of the switchable valve was prevented. From the inside to the outside, gases such as air or water vapour may exit inner area 29 through the sealing member 25 of the film assembly 10 in the direction of the arrow shown. Increasing the first fluid pressure causes the film assembly 10 to stretch.

In an alternative embodiment, the film assembly of Example 2B2 may be used in which the sealing member comprises an additional circular elastomeric coating. In such an embodiment, from the outside to the inside, when the vent was closed, the penetration of e.g. liquid water, water vapour and oils, through the film assembly into the inner area of the switchable valve was prevented. From the inside to the outside venting of gases such as air or water vapour through the sealing member is reduced compared to the embodiment of the film assembly of Example 2B1, due to the presence of the elastomeric coating forming the sealing member. In those embodiments in which the elastomeric coating prevents the passage of gases such as air or water through the sealing member, a check valve is obtained.

From the inside of switchable valve 5, once a desired pressure is reached, the sealing member 25 portion of the film assembly 10 was lifted from the first opening 22 allowing fluid communication between the first opening 22 and second openings 24 as shown in FIG. 34C. The second openings were in fluid communication with the outside of the switchable valve i.e. the environment external to the inner area of the switchable valve. This represents the open state of the switchable valve.

The second openings 24 were channels through the base 28 of the valve substrate. The second openings 24 were located on base 28 between the protuberance 26 containing the first opening 22 and the bond area 30 in a second venting area. In an alternative embodiment not shown in FIGS. 34B and C, the second openings could be located elsewhere on the valve substrate, as long as they were present in the second venting area and could enter into fluid communication with the first opening upon removal of the sealing member. For instance, the second openings could be located in a side wall (not shown) of the valve substrate to which the perimeter of the film assembly could be attached. In such an embodiment, in the open state of the switchable valve, the fluid would vent through the second openings in a stream perpendicular to the stream flowing through the first opening. This is in contrast to the embodiment shown in FIG. 34C in which the fluid venting through the second openings is a countercurrent stream to that leaving inner area via the first opening.

Returning to FIG. 34C, in the open state, the expansion of the film assembly 10 released the sealing member 25 from the first opening 22 allowing the pressure in the inner area 29 of the switchable valve to equilibrate with the outside through second openings 24 of the second vent area in the direction of the arrows shown. The elastomeric support material of the film assembly 10 was then in its stretched state. Gaseous and liquid fluids such as one or more of air, moisture and liquid water, for instance, may flow from the interior area 29 of the valve through the second vent area adjacent to the sealing member to the outside of the valve via second openings 24. If equilibrium between the internal and external pressures of the switchable valve is reached, the elastomeric support material returns to its relaxed state, causing the sealing member 25 to lower onto the first opening 22, and closing the switchable valve again.

Example 2B5

The film assembly of Example 2B1 was circularly cut out and bonded to a valve substrate to provide a switchable valve. FIG. 35A shows the bond areas 30 at the perimeter of the circular film assembly, which were discontinuous around the perimeter of the circular film assembly, such that non-bonded areas 34 between the film assembly and valve substrate at the perimeter of the film assembly were present. FIGS. 35B and C show the cross-section of the switchable valve at plane 32 of FIG. 35A, while FIG. 36 shows a representation of a three dimensional view of the switchable valve in the open state.

Referring to FIG. 35B, film assembly 10 was attached to the base 28 of a valve substrate 20. Bond areas (not shown in the cross-section of FIG. 35B) attached the elastomeric support material of the film assembly 10 to the base 28 of the valve substrate 20. The elastomeric support material was on the face of the film assembly 10 directed inward towards and adjacent to the valve substrate 20 and the structured film of the film assembly 10 was on the opposite side facing outward from the valve substrate.

The valve substrate 20 had a first opening 22. The first opening 22 was formed by a hole to provide a channel through the base 28 of the valve substrate 20 to inner area 29. The film assembly 10 was bonded onto the base 28 of the valve substrate 20 in such a way that in a relaxed state the film assembly was congruent and in contact with the surface of the base 28 through which the first opening 22 emerges, thereby forming a sealing member 25 over first opening 22 to provide a switchable valve 5.

FIG. 35B shows the switchable vent in the closed position. From the outside to the inside, when the switchable vent was closed, the penetration of e.g. liquid water, water vapour and oils, through the film assembly 10 into the first area 29 of the switchable valve was prevented. From the inside to the outside, gases such as air or water vapour may exit first area 29 through the film assembly 10 in the direction of the arrow shown.

In an alternative embodiment, the film assembly of Example 2B2 may be used in which the sealing member comprises an additional circular elastomeric coating. In such an embodiment, from the outside to the inside, when the vent was closed, the penetration of e.g. liquid water, water vapour and oils, through the film assembly into the inner area of the switchable valve was prevented. From the inside to the outside venting of gases such as air or water vapour through the sealing member is reduced compared to the embodiment of the film assembly of Example 2B1, due to the presence of the elastomeric coating forming the sealing member. In those embodiments in which the elastomeric coating prevents the passage of gases such as air or water through the sealing member, a check valve is obtained.

Increasing the first fluid pressure causes the film assembly 10 to stretch. From the inside, once a desired pressure is reached the sealing member 25 portion of the film assembly 10 is lifted from the first opening 22. The film assembly 10 is also lifted from the base 28 of the valve substrate 20 forming second openings 24 at the non-bonded areas of the perimeter allowing fluid communication between the inner area 29 and outside of the switchable valve via the second vent area formed between the base 28 and the film assembly 10 as shown in FIG. 35C. In the open state, the expansion of the film assembly can release the sealing member from the first opening 22 allowing the pressure in the first area 29 of the switchable valve 5 to equilibrate with the outside in the direction of the arrows shown. The elastomeric support material of the film assembly is then in its stretched state.

FIG. 36 shows a representation of an external three dimensional view of the switchable valve 5 in the open state. The second openings 24 formed in the non-bonded areas of the circular film assembly are shown. The second openings 24 are in fluid communication with the outside of the switchable valve i.e. the environment external to the first area of the switchable valve. Fluids such as one or more of air, water vapour and liquid water, for instance, may flow from the interior area of the valve through the second vent area between film assembly 10 and base 28 to the outside via second openings 24. If equilibrium between the internal and external pressure of the switchable valve is reached, the elastomeric support material returns to its relaxed state, causing the sealing member to lower onto the base 28, sealing the first opening and second openings 24, and closing the valve again.

Example 2D1

Figure 23:
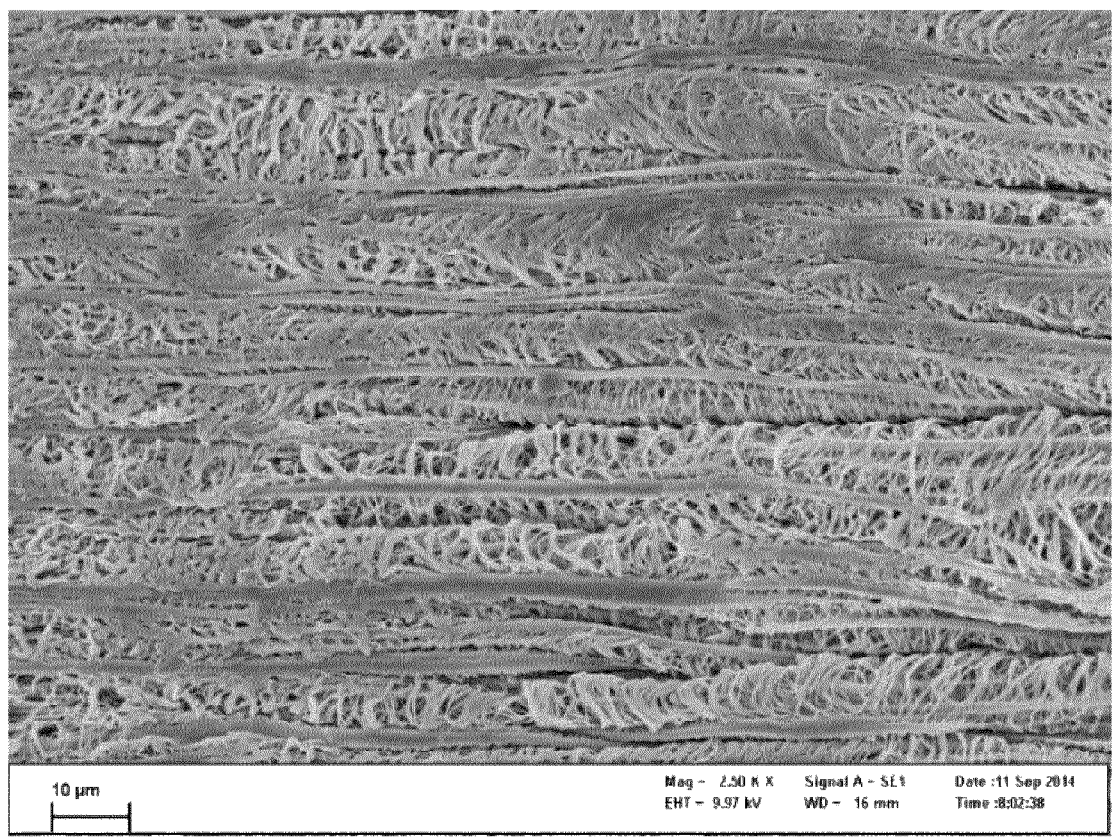
FIG. 23 is a SEM image (top view) of the compacted film of Example 2D1.

The obtained compacted film of Example 2D (see FIG. 23) was coated with an elastomeric support material to form a film assembly. A 100 micron paper was lasercut with slots of 100 micron width and a distance of about 1 mm. Wacker Elastosil RT 620 Silicones component A and B were mixed at a weight ratio of 9:1 and the material was pressed through the slots of the paper. The material was cured in an oven for 3 min at 80° C.

Figure 24:
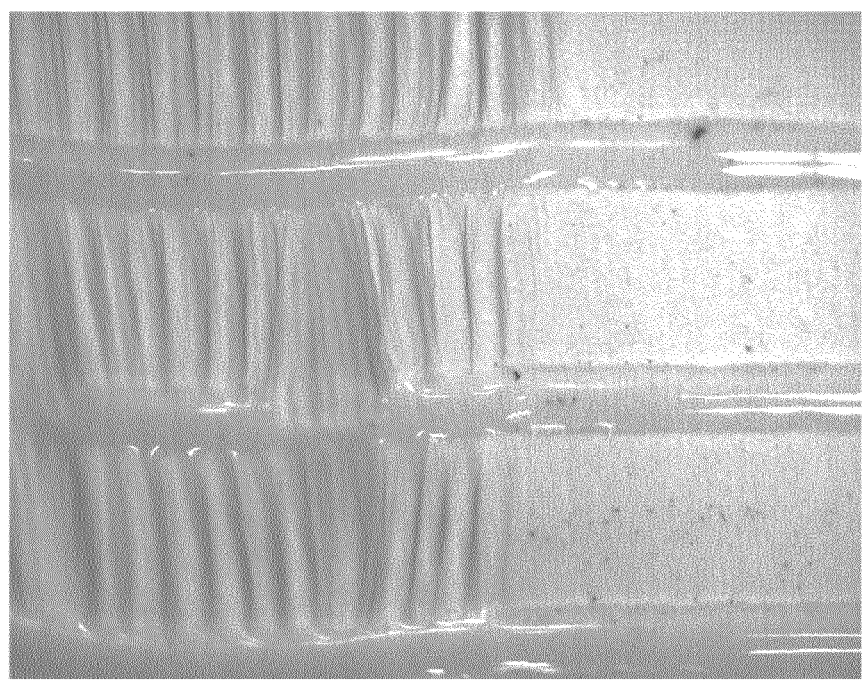
FIG. 24 is an image showing the surface of Example 2D1 with elastomeric line coating before (right hand side) and after the first stretch cycle with periodic wrinkling (left hand side).

FIG. 24 shows on the right hand side the compacted film of Example 2D with elastomeric line coatings. On the left hand side the film assembly is shown after the first stretch cycle. Periodic wrinkle pattern occur between the elastomeric lines.

Example 3

An ePTFE membrane was made by processes known in the art for example US20140120286 A1. The membrane had an average ATEQ airflow of 500 l/hr (at 70 mbar test pressure), a thickness of 25 μm and a mass/area of 6.5 g/m².

The membrane was adhered to a prestretched PDMS (Elastosil RT620, Wacker silicones) sheet with slight pressure. The PDMS sheet was relaxed in longitudinal direction as can be seen in following Table 2.

TABLE 2

|  | 3A (reference) | 3B |
| --- | --- | --- |
| Processing type | — | Longitudinal |
| Processing ratio [%] | 100 | 300 |
| Processing temperature [° C.] | 20 | 20 |
| Elastic substrate | — | Elastosil RT 620 |
| Elastic substrate surface | — | smooth |
| Structure density direction x | — | 0.0/mm |
| Structure density direction y | — | 0.0/mm |

Example 3B1

The film of Example 3B was bonded to a 12 mm Polyurethane hotmelt grid material (Protechnic, France) in a heatpress at 100° C. for 5 s and 3 bar pressure. After cooling the sample was removed from the substrate it was compacted on. At removal the compacted parts of the film in between the grid unfolded and a controlled 3D patterned surface was obtained. The parts of the compacted film being bonded to the grid are still in their compacted state.

Figure 25:
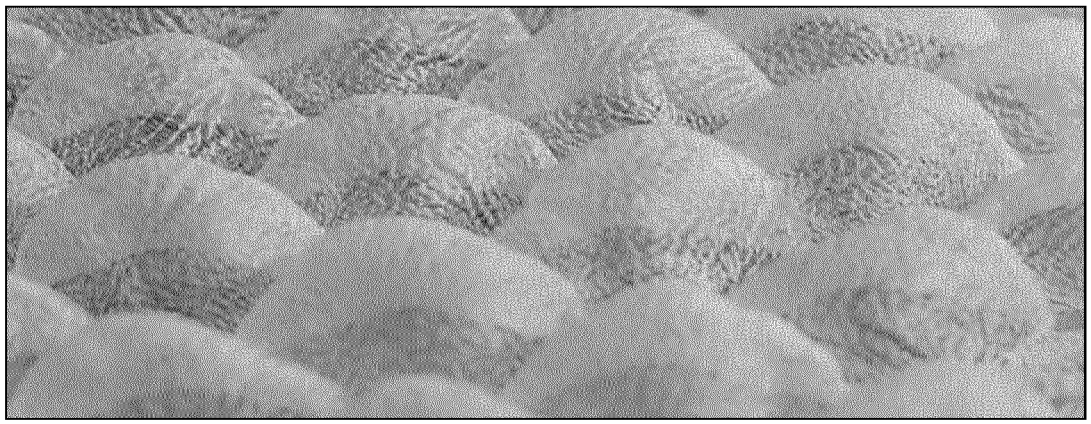
FIG. 25 is a side view image (side view) of the obtained patterned film assembly (Example 3B1).

FIG. 25 shows an image of the obtained film assembly with released sections having semi-spherical shape.

Example 4

An ePTFE membrane was made by processes known in the art, for example in US 2007/0012624 A1. The membrane had an average mass/area of 0.5 g/m² and a thickness of about 0.6 μm.

PDMS (Elastosil RT 620) was used as elastic substrate. The membrane was adhered to the elastic substrate in a prestretched state with slight pressure using the rotatable elastic carrier belt of Example D2 above (see also FIG. 2). The elastic substrate was relaxed in the transverse upon rotation. Example 4D was compacted over its potential to be compacted, and a periodic delamination of the film from the elastic substrate occurred. The structure density for example 4D is 125 per mm.

Figure 26:
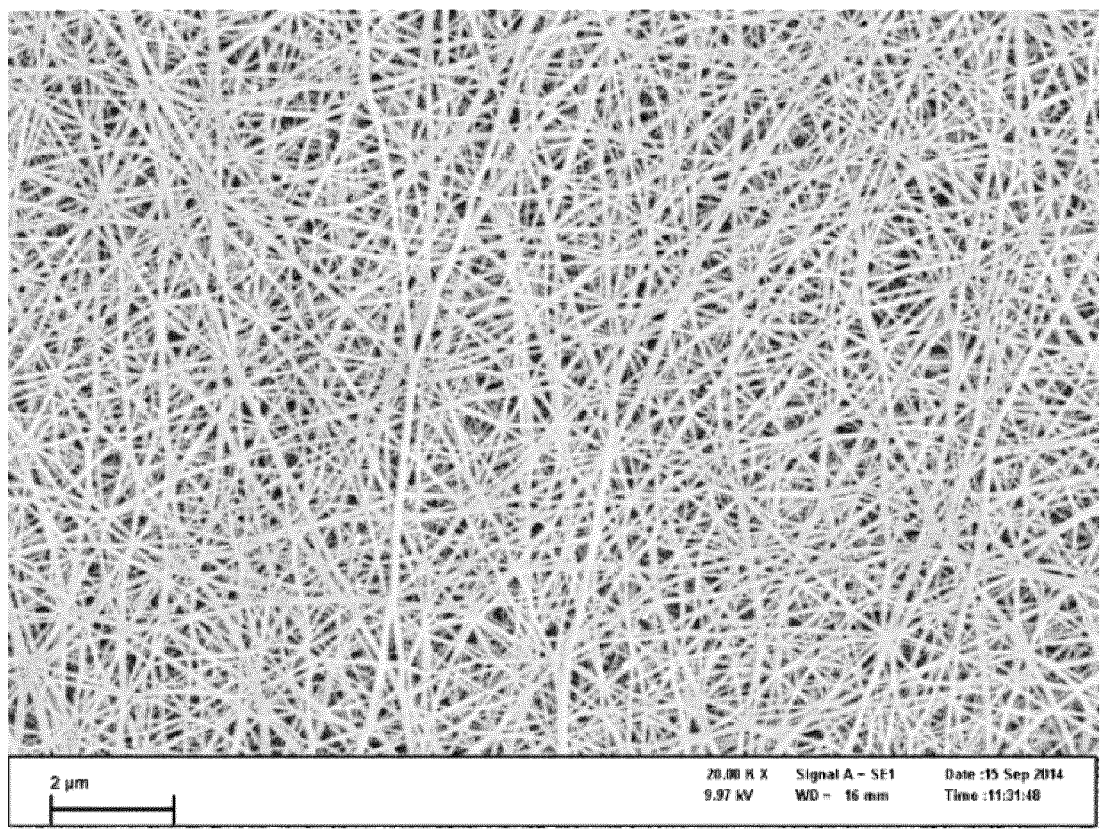
FIG. 26 is a SEM image showing a top view of the reference film of Example 4A.
Figure 27:
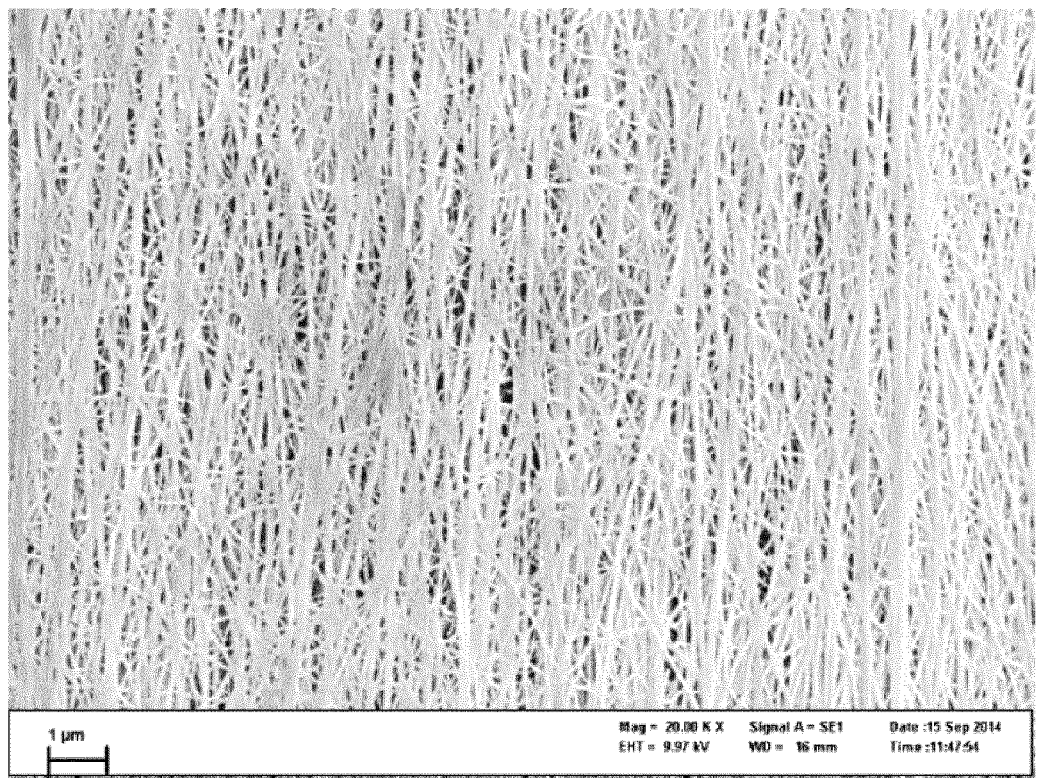
FIG. 27 is a SEM image (top view) of the compacted film of Example 4B.
Figure 28:
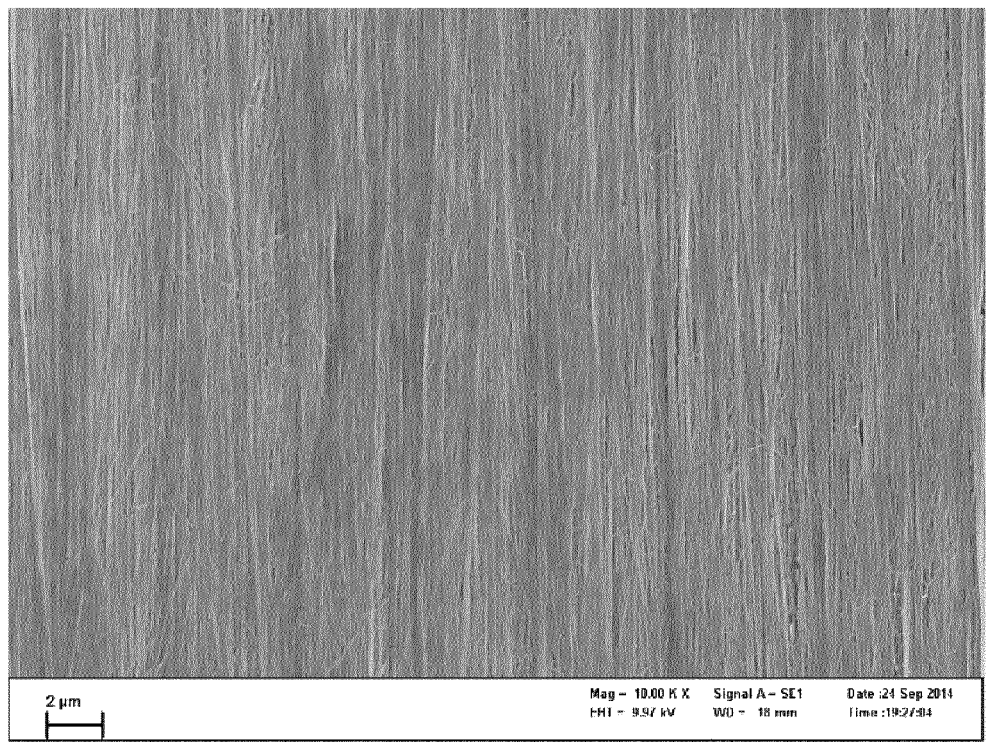
FIG. 28 is a SEM image (top view) of the compacted film of Example 4C.

SEM images of Examples 4A, 4B and 4C are shown in FIGS. 26 to 28. Results and processing conditions are given in Table 3 below.

TABLE 3

|  | 4A (reference) | 4B | 4C | 4D |
| --- | --- | --- | --- | --- |
| Processing type | — | transverse | transverse | transverse |
| Processing ratio [%] | 100 | 250 1pass | 625 2pass | 1560 3pass |
| Processing temperature [° C.] | 20 | 20 | 20 | 20 |
| Elastic substrate | — | Elastosil RT 620 | Elastosil RT 620 | Elastosil RT 620 |
| Elastic substrate surface | — | smooth | smooth | smooth |
| Structure density direction x | — | 0.0/mm | 0.0/mm | 125/mm |
| Structure density direction y | — | 0.0/mm | 0.0/mm | 0.0/mm |

Example 5

Example 5 is a structured film obtained by the exemplary process for the formation of a structured porous film as described above. An ePTFE membrane was made by processes known in the art, for example U.S. Pat. No. 3,953,566. The membrane had an average matrix tensile strength of 10 N/mm² in machine direction and 25 N/mm² in transverse direction, an airflow of 8 Gurley seconds, a bubble point of 1.5 bar, a thickness of 35 μm, mass/area of 17 g/m², and mean flow pore size of 0.18 μm.

A Bicomponent Copolyester Spunbond was used as support material. To adhere the support material to the membrane samples a polyurethane hot melt web adhesive (Article Number: D6C8F 10 g/m²; Company: Protechnic (France)) was used. The web adhesive was pre-applied to the support material in a heat press at 120° C. and 5 psi (0.34 bar) areal pressure at 15 seconds dwell time. The support material with pre-adhered adhesive layer was placed on top of the membrane, the adhesive layer facing towards the membrane. A 10 mm thick, 150 mm diameter silicone sheet (Elastosil RT620) was preheated in an oven to reach 150° C.

The upper silicone sheet was placed on top of the support material. An aluminium rod with a diameter of 80 mm and a mass of 5 kg was placed on top of the upper silicone sheet for 10 s to create a bond between the membrane sample and the support material.

After 10 s the rod and upper silicone sheet were removed and the sample was cooled for 3 min before removing from the lower silicone sheet material.

The elastic substrate of a device according to FIG. 1 is stretched to the desired processing ratio with air inflation. After reaching the desired stretched state, a valve is closed to keep the processing ratio on a constant state. The film sample is applied on the stretched elastic substrate and a force is applied with a rubber roller to adhere the film sample to the elastic substrate.

After sufficient adhesion is achieved, the air valve is opened to release the inner pressure that stretches the elastic substrate.

A typical processing time was 3 seconds for Elastosil RT620 inflated to a processing ratio of 200%. The elastic substrate retracts back to its original unstretched, flat shape. The adhered film retracts with the elastic substrate, but is structured after the process.

Processing details and results are given in Table 4 below. FIG. 29 shows the determination of the structure density of the film (left hand side), and a surface topography of the film right hand side).

TABLE 4

|  | Example 5 |
| --- | --- |
| processing type | biaxial |
| Processing ratio (%) | 300 |
| processing temp. (° C.) | 20 |
| elastic substrate | Elastosil RT620 |
| elastic substrate surface | smooth |
| airflow ATEQ - up (l/h) | 105.90 |
| airflow ATEQ - down (l/h) | 101.80 |
| structure height (μm) | 890 |
| structure density, direction x | 1.5/mm |
| structure density, direction y | 1.5/mm |
| Area increase factor (calc. from proc. ratio(s)) | 9 |

The invention claimed is:

1. A process for the formation of an assembly comprising a structured porous film the process, compromising:
   a) applying a porous film onto an elastic substrate in a stretched state such that a reversible adhesion of the film on the stretched substrate occurs;
   b) relaxing the substrate with the applied film thereon to obtain a structured porous film; and
   c) applying a support material to at least a part of the structured film so that the structured porous film to which no support material is attached is releasable.

2. The process according to claim 1, wherein the support material is a stabilizing support material or an elastomeric support material.

3. The process according to claim 1, further comprising:
   d) releasing the structured film.

4. The process according to claim 1, wherein the porous film comprises a member selected from a fluoropolymer, a polyvinylalcohol, and a polyurethane.

5. The process according to claim 1, wherein the substrate comprises a member selected from polysiloxane, fluorosilicone, and a rubber.

6. The process according to claim 1, wherein the substrate in step a) is stretched by at least 110% in at least one direction.

7. The process according to claim 1, wherein the elastic substrate is stretched at most 1100% in at least one direction.

8. The process according to claim 1, wherein the substrate is uniaxially or biaxially stretched.

9. The process according to claim 1, further comprising removing the structured film from the elastic substrate.

10. A process for the formation of a compacted porous film comprising:
    a) application of a porous film onto an elastic substrate in a stretched state such that a reversible adhesion of the film on the stretched substrate occurs; and
    b) relaxing the substrate with the applied film thereon to obtain a compacted porous film.

11. The process according to claim 10, further comprising applying a stabilizing support material or an elastomeric support material to the compacted film.

12. The process according to claim 10, wherein the film comprises a member selected from a fluoropolymer, a polyvinylalcohol, and a polyurethane.

13. The process according to claim 10, wherein the substrate comprises a member selected from a polysiloxane, fluorosilicone, and a rubber.

14. The process according to claim 10, wherein the substrate in step a) is stretched by at least 110% in at least one direction.

15. The process according to claim 10, wherein the elastic substrate is stretched by at most 1100% in at least one direction.

16. The process according to claim 10, wherein the substrate is uniaxially or biaxially stretched.

17. The process according to claim 10, further comprising removing the compacted film from the elastic substrate.

* * * * *